(12) United States Patent
Wakizaka et al.

(10) Patent No.: US 9,048,499 B2
(45) Date of Patent: Jun. 2, 2015

(54) CATALYST, PRODUCTION PROCESS THEREFOR AND USE THEREOF

(75) Inventors: Yasuaki Wakizaka, Chiba (JP); Ryuji Monden, Chiba (JP); Toshikazu Shishikura, Chiba (JP); Takuya Imai, Chiba (JP); Kenichiro Ota, Koganei (JP)

(73) Assignee: SHOWA DENKO K.K., Tokyo (JP)

( * ) Notice: Subject to any disclaimer, the term of this patent is extended or adjusted under 35 U.S.C. 154(b) by 726 days.

(21) Appl. No.: 13/319,617

(22) PCT Filed: May 11, 2010

(86) PCT No.: PCT/JP2010/057927
§ 371 (c)(1),
(2), (4) Date: Nov. 9, 2011

(87) PCT Pub. No.: WO2010/131634
PCT Pub. Date: Nov. 18, 2010

(65) Prior Publication Data
US 2012/0058415 A1 Mar. 8, 2012

(30) Foreign Application Priority Data

May 11, 2009 (JP) ................................. 2009-114682

(51) Int. Cl.
*H01M 8/02* (2006.01)
*H01M 4/86* (2006.01)
(Continued)

(52) U.S. Cl.
CPC ............ *H01M 4/9016* (2013.01); *B01J 27/135* (2013.01); *H01M 4/86* (2013.01); *H01M 4/88* (2013.01); *B01J 21/063* (2013.01); *B01J 38/08* (2013.01); *B01J 27/20* (2013.01);
(Continued)

(58) Field of Classification Search
USPC .......................................... 429/526, 492, 528
See application file for complete search history.

(56) References Cited

U.S. PATENT DOCUMENTS 5,811,624 A * 9/1998 Hantzer et al. ................. 585/700
8,007,691 B2 8/2011 Sawaki et al.
(Continued)

FOREIGN PATENT DOCUMENTS

JP 10-251832 A 9/1998
JP 2002-95976 A 4/2002
(Continued)

OTHER PUBLICATIONS

Y. Ohgi, et al., "Catalytic activity of partially-oxidized transition metal carbonitrides for oxygen reduction reaction", The Electrochemical Society of Japan Dai 74 Kai Taikai Koen Yoshishu, Mar. 29, 2007, p. 94, lower part.

(Continued)

*Primary Examiner* — Basia Ridley
*Assistant Examiner* — Caitlin Wilmot
(74) *Attorney, Agent, or Firm* — Sughrue Mion, PLLC

(57) ABSTRACT

[Object]
The invention provides catalysts that are not corroded in acidic electrolytes or at high potential and have excellent durability and high oxygen reducing ability.
[Solution]
A catalyst of the invention includes a metal oxycarbonitride that contains titanium and at least one metal (hereinafter, also referred to as "metal M" or simply "M") selected from silver, calcium, strontium, yttrium, ruthenium, lanthanum, praseodymium, neodymium, promethium, samarium, europium, gadolinium, terbium, dysprosium, holmium, erbium, thulium, ytterbium and lutetium.

12 Claims, 18 Drawing Sheets

(51) Int. Cl.
  *H01M 4/88*      (2006.01)
  *H01M 4/90*      (2006.01)
  *B01J 21/06*     (2006.01)
  *B01J 23/46*     (2006.01)
  *B01J 23/54*     (2006.01)
  *B01J 37/08*     (2006.01)
  *B01J 27/20*     (2006.01)
  *B01J 27/135*    (2006.01)
  *B01J 38/08*     (2006.01)
  *B01J 27/24*     (2006.01)

(52) U.S. Cl.
  CPC ............... *B01J 21/06* (2013.01); *B01J 27/24* (2013.01); *Y02E 60/50* (2013.01)

(56) References Cited

U.S. PATENT DOCUMENTS

| | | |
|---|---|---|
| 2002/0006865 A1 | 1/2002 | Morikawa et al. |
| 2006/0154108 A1 | 7/2006 | Fukui et al. |
| 2009/0202869 A1 | 8/2009 | Sawaki et al. |
| 2010/0227253 A1 | 9/2010 | Monden et al. |
| 2010/0331172 A1 * | 12/2010 | Monden et al. ............... 502/174 |

FOREIGN PATENT DOCUMENTS

| | | | |
|---|---|---|---|
| JP | 2003-342058 A | 12/2003 | |
| JP | 2006-107967 A | 4/2006 | |
| JP | 2006-198570 A | 8/2006 | |
| JP | 2007-031781 A | 2/2007 | |
| JP | 2008-004286 A | 1/2008 | |
| JP | WO2009/104500 * | 8/2009 | ............... B01J 27/24 |
| WO | 2005/053887 A1 | 6/2005 | |
| WO | 2009/031383 A1 | 3/2009 | |

OTHER PUBLICATIONS

Doi et al., "Zirconium-Based Compounds for Cathode of Polymer Electrolyte Fuel Cell", Journal of the Electrochemical Society, 2007, vol. 154, No. 3, pp. B362-B369.

* cited by examiner

_US 9,048,499 B2_

CATALYST, PRODUCTION PROCESS THEREFOR AND USE THEREOF

CROSS REFERENCE TO RELATED APPLICATION

This application is a National Stage of International Application No. PCT/JP2010/057927 filed May 11, 2010, claiming priority based on Japanese Patent Application No. 2009-114682 filed May 11, 2009.

TECHNICAL FIELD

The present invention relates to catalysts, processes for producing the same, and uses of the catalysts. More particularly, the invention relates to fuel cell electrode catalysts, processes for producing the same, and uses of the catalysts.

BACKGROUND ART

A catalyst accelerates the rate of a chemical equilibrium reaction by lowering the activation energy of the reaction and is used in a wide range of chemical reaction processes such as synthesis and decomposition processes. A homogeneous catalyst which is dispersed, for example dissolved, in a solvent allows for efficient synthesis of a target compound in a liquid phase or the like. A heterogeneous catalyst is composed of a catalytic substance immobilized on a carrier. It efficiently catalyzes synthesis or decomposition of a target substance and can be easily separated and recovered from the product. Thus, the heterogeneous catalysts are particularly useful in large-scale chemical synthesis plants. An electrode catalyst is a heterogeneous catalyst which is immobilized on the surface of an electrode and permits an electrochemical reaction to proceed at a lower overvoltage. In particular, the electrode catalysts are needed in fuel cells for the purposes of lowering the overvoltage and generating larger amounts of electrical energy.

Fuel cells are classified into several types according to the electrolytes or the electrodes used therein. Typical types are alkaline types, phosphoric acid types, molten carbonate types, solid electrolyte types and polymer electrolyte types. In particular, polymer electrolyte fuel cells that can operate at temperatures ranging from low temperatures (about −40° C.) to about 120° C. have attracted attention and have been progressively developed and practically used as low-pollution power sources for automobiles. The polymer electrolyte fuel cells are expected to be used as automobile drive sources or stationary power sources. However, the use in these applications requires long-term durability.

The polymer electrolyte fuel cell has a solid polymer electrolyte sandwiched between an anode and a cathode. A fuel is fed to the anode, and oxygen or air is supplied to the cathode, whereby oxygen is reduced at the cathode to produce electricity. The fuel is usually hydrogen or methanol.

To increase the reaction rate in a fuel cell and enhance the energy conversion efficiency, a layer containing a catalyst (hereinafter, also referred to as "fuel cell catalyst layer") is conventionally provided on the surface of a cathode (an air electrode) or an anode (a fuel electrode) of a fuel cell.

Here, noble metals are generally used as the catalysts. Of the noble metals, platinum that is stable at high potential and has high activity is most frequently used. However, since platinum is expensive and exists in a limited amount, alternative catalysts have been desired.

Further, the noble metals used on the cathode surface are often dissolved in an acidic atmosphere and are not suited in applications requiring long-term durability. Accordingly, it has been strongly demanded that catalysts be developed which are not corroded in an acidic atmosphere and have excellent durability and high oxygen reducing ability.

Materials containing nonmetals such as carbon, nitrogen and boron have captured attention as alternative catalysts to platinum catalysts. The materials containing these nonmetals are inexpensive compared to the noble metals such as platinum and are abundant.

Nonpatent Literature 1 reports that zirconium-based ZrOxN compounds show oxygen reducing ability.

Patent Literature 1 discloses, as platinum-alternative materials, oxygen-reducing electrode materials containing a nitride of one or more elements selected from Groups 4, 5 and 14 in the long periodic table.

However, the materials containing these nonmetals do not have sufficient oxygen reducing ability for practical use as catalysts.

Patent Literature 2 discloses an oxycarbonitride obtained by mixing a carbide, an oxide and a nitride and heating the mixture in vacuum or an inert or non-oxidative atmosphere at 500 to 1500° C.

However, the oxycarbonitride disclosed in Patent Literature 2 is a thin-film magnetic head ceramic substrate material, and the use of the oxycarbonitride as catalyst is not considered therein.

Patent Literature 3 considers the possibility for a perovskite oxide containing two or more metals to be used as a platinum-alternative catalyst. However, as demonstrated in Examples, the oxide only serves as a carrier which assists platinum. Thus, improvements in activity are still needed.

Meanwhile, platinum is useful not only as a fuel cell catalyst as described above but as a catalyst in exhaust gas treatment or organic synthesis. However, the expensiveness and the limited amount of platinum have created a need of alternative catalysts in these applications as well.

CITATION LIST

Patent Literatures

Patent Literature 1: JP-A-2007-031781
Patent Literature 2: JP-A-2003-342058
Patent Literature 3: JP-A-2008-04286

Nonpatent Literature

Nonpatent Literature 1: S. Doi, A. Ishihara, S. Mitsushima, N. Kamiya, and K. Ota, Journal of The Electrochemical Society, 154 (3) B362-B369 (2007)

SUMMARY OF INVENTION

Technical Problem

The present invention is aimed at solving the problems in the background art described above. It is therefore an object of the invention to provide catalysts that are not corroded in acidic electrolytes or at high potential and have excellent durability and high oxygen reducing ability.

Solution to Problem

The present inventors carried out studies to solve the conventional problems in the art. They have then found that catalysts that are formed of a metal oxycarbonitride containing a specific metal M and titanium are not corroded in acidic electrolytes or at high potential and have excellent durability and high oxygen reducing ability. The present invention has been completed based on the finding.

For example, the present invention is concerned with the following (1) to (16).

(1) A catalyst comprising a metal oxycarbonitride that contains titanium and at least one metal (hereinafter, also referred to as "metal M" or simply "M") selected from the group consisting of silver, calcium, strontium, yttrium, ruthenium, lanthanum, praseodymium, neodymium, promethium, samarium, europium, gadolinium, terbium, dysprosium, holmium, erbium, thulium, ytterbium and lutetium.

(2) The catalyst described in (1), wherein the metal oxycarbonitride is represented by the compositional formula $Ti_aM_bC_xN_yO_z$ (wherein a, b, x, y and z represent a ratio of the numbers of the atoms, $0.7 \leq a \leq 0.9999$, $0.0001 \leq b \leq 0.3$, $0.01 \leq x \leq 2$, $0.01 \leq y \leq 2$, $0.01 \leq z \leq 3$, $a+b=1$, and $x+y+z \leq 5$).

(3) The catalyst described in (1) or (2), which is a fuel cell catalyst.

(4) A process for producing the catalyst described in any one of (1) to (3), comprising a step of obtaining the metal oxycarbonitride from a metal carbonitride containing the metal M and titanium.

(5) A process for producing the catalyst described in any one of (1) to (3), comprising a step (step 1) of obtaining a metal carbonitride by heat treating a mixture that includes a compound containing the metal M and a compound containing titanium in nitrogen or a nitrogen compound-containing mixture gas; and a step (step 2) of obtaining the metal oxycarbonitride by heat treating the metal carbonitride in an oxygen-containing mixture gas.

(6) A process for producing the catalyst described in any one of (1) to (3), comprising a step (step 1a) of obtaining a metal carbonitride by heat treating a mixture that includes a metal M oxide, titanium oxide and carbon in nitrogen or a nitrogen compound-containing mixture gas; and a step (step 2a) of obtaining the metal oxycarbonitride by heat treating the metal carbonitride in an oxygen-containing mixture gas.

(7) The process described in (5) or (6), wherein the heat treatment in the step (step 1 or step 1a) is performed at a temperature in the range of 600 to 2200° C.

(8) The process described in (5) or (6), wherein the heat treatment in the step (step 2 or step 2a) is performed at a temperature in the range of 600 to 1500° C.

(9) The process described in any one of (5) to (8), wherein the oxygen-containing mixture gas in the step (step 2 or step 2a) has an oxygen concentration in the range of 0.005 to 2.5% by volume of the mixture gas.

(10) The process described in any one of (5) to (9), wherein the oxygen-containing mixture gas in the step (step 2 or step 2a) further contains hydrogen at a concentration in the range of 0.01 to 5% by volume.

(11) A fuel cell catalyst layer comprising the catalyst described in any one of (1) to (3).

(12) The fuel cell catalyst layer described in (11), which further comprises electron conductive particles.

(13) An electrode comprising a fuel cell catalyst layer and a porous support layer, wherein the fuel cell catalyst layer is the fuel cell catalyst layer described in (11) or (12).

(14) A membrane electrode assembly comprising a cathode, an anode and an electrolyte membrane interposed between the cathode and the anode, wherein the cathode and/or the anode is the electrode described in (13).

(15) A fuel cell comprising the membrane electrode assembly described in (14).

(16) A polymer electrolyte fuel cell comprising the membrane electrode assembly described in (14).

Advantageous Effects of Invention

The catalysts according to the invention are stable and are not corroded in acidic electrolytes or at high potential, have high oxygen reducing ability and are inexpensive compared to platinum catalysts. The fuel cells having the catalysts are therefore relatively inexpensive and have high performance.

DESCRIPTION OF EMBODIMENTS

<Catalysts>

Figure 1:
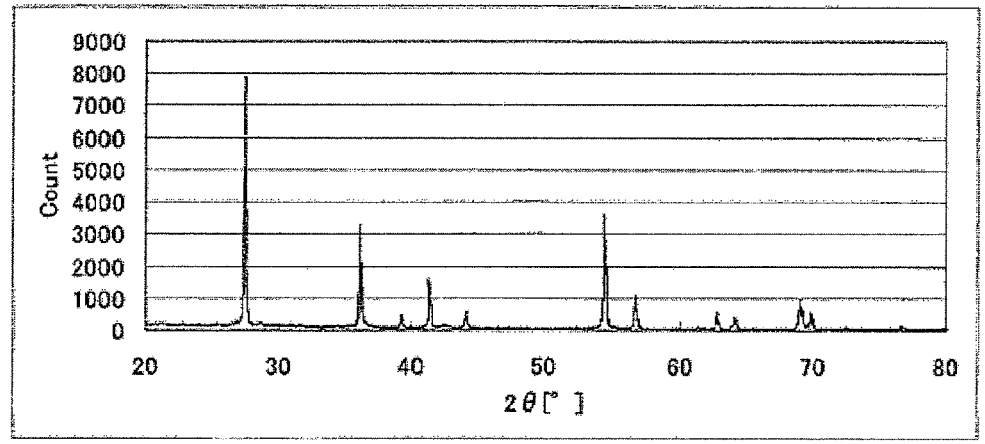
FIG. 1 is a powder X-ray diffraction spectrum of an oxycarbonitride (1) in Example 1.

A catalyst according to the present invention includes an oxycarbonitride of two or more kinds of metals including titanium and at least one metal M selected from silver, calcium, strontium, yttrium, ruthenium, lanthanum, praseodymium, neodymium, promethium, samarium, europium, gadolinium, terbium, dysprosium, holmium, erbium, thulium, ytterbium and lutetium.

In particular, the metal M being calcium or strontium is more advantageous in the industry because these metals are relatively inexpensive. Yttrium, lanthanum or samarium as the metal M is also preferable because of particularly high catalytic performance. Of these, lanthanum or samarium is preferable because particularly high oxygen reduction potential is obtained. In particular, lanthanum is relatively inexpensive and is thus preferable.

When the inventive catalyst that is formed of the metal oxycarbonitride is analyzed by elemental analysis, at least titanium, the metal M, carbon, nitrogen and oxygen are detected. It is conceivable that these elements form a single compound or a mixture of compounds. For a catalyst to be used as an electrode catalyst, an additive for adding conductive properties, in detail electron conductive particles such as carbon black, for example VULCAN XC72 or Ketjen black, is often added. Such conductive particles may be used in carrying out the present invention. However, the inventive catalyst that is formed of the metal oxycarbonitride is found by elemental analysis to contain carbon even if such an additive for adding conductive properties has not been added to the catalyst.

When the inventive catalyst formed of the metal oxycarbonitride is analyzed by powder X-ray diffractometry (Cu-Kα radiation), oxide gives rise to the main peak in the obtainable XRD spectrum. In particular, the main metal component in the inventive compound is titanium, and the main diffraction peak in the XRD spectrum is a peak assigned to rutile titanium oxide (observed between 27° and 28° by the method that will be described later). In a preferred embodiment, the height of the diffraction peak assigned to the rutile titanium oxide is at least two times, more preferably at least five times, and still more preferably at least ten times the height of the most intensive peak that is assigned to other than the rutile titanium oxide. That is, when the catalyst that includes the inventive oxycarbonitride is a mixture, it is possible that the crystalline component has a rutile structure and an amorphous compound is contained in the mixture.

A diffraction peak refers to a peak that is observed at a specific diffraction angle and a specific diffraction intensity when a sample (crystal) is irradiated with X-rays at various angles. In the invention, a signal that is detected with a signal (S) to noise (N) ratio (S/N) of 2 or more is regarded as a diffraction peak. Here, the noise (N) is the width of the baseline.

The X-ray diffractometer may be powder X-ray diffractometer Rigaku RAD-RX. The measurement conditions may be X-ray output (Cu-Kα): 50 kV, 180 mA; scan axis: θ/2θ; measurement angles (2θ): 10° to 89.98°; measurement mode: FT; scanning width: 0.02°; sampling time: 0.70 sec; DS, SS and RS: 0.5°, 0.5° and 0.15 mm; and goniometer radius: 185 mm.

The crystalline components in the metal oxycarbonitride obtained through the steps according to the invention have at least an oxide crystal structure. In other words, it is possible that [1] the metal oxycarbonitride is a compound having a rutile oxide structure in which part of the oxygen atoms are replaced by carbon or nitrogen, or [2] titanium and oxygen are present as a crystalline compound, namely, as an oxide possibly having an oxygen vacancy, and carbon and nitrogen are present as an amorphous compound. Further, another possibility is that the metal oxycarbonitride is a mixture of the compounds described in [1] and [2]. It is, however, difficult to separate and identify these compounds.

Because the catalyst of the invention is possibly a mixture as described above, it is difficult to determine the proportions of carbon, nitrogen and oxygen that are contained in each of the metal oxycarbonitrides, the crystalline oxides and the amorphous carbon/nitrogen compounds. However, it is preferable that the whole metal oxycarbonitride be represented by the compositional formula $Ti_aM_bC_xN_yO_z$ (wherein M is the added metal(s), a, b, x, y and z represent a ratio of the numbers of the atoms, $0.7 \leq a \leq 0.9999$, $0.0001 \leq b \leq 0.3$, $0.01 \leq x \leq 2$, $0.01 \leq y \leq 2$, $0.01 \leq z \leq 3$, $a+b=1$, and $x+y+z \leq 5$). More preferably, higher catalytic activity is achieved when $0.8 \leq a \leq 0.999$, $0.001 \leq b \leq 0.2$, $0.01 \leq x \leq 2$, $0.01 \leq y \leq 2$, $0.01 \leq z \leq 3$, $a+b=1$, and $x+y+z \leq 5$. Still more preferably, the catalytic activity is further increased when $0.9 \leq a \leq 0.999$, $0.001 \leq b \leq 0.1$, $0.01 \leq x \leq 2$, $0.01 \leq y \leq 2$, $0.01 \leq z \leq 3$, $a+b=1$, and $x+y+z \leq 5$.

The ratio of the numbers of the atoms in the above ranges is preferable in that the oxygen reduction potential tends to be increased.

The catalyst in the invention preferably has an oxygen reduction onset potential of not less than 0.5 V as measured versus a reversible hydrogen electrode (vs. NHE) by the measurement method (A) described below.

[Measurement Method (A)]

The catalyst and carbon as electron conductive particles are added to a solvent, and the mixture is ultrasonically stirred to give a suspension in which the catalyst dispersed on the electron conductive carbon particles accounts for 0.9 wt %. The carbon herein is carbon black (specific surface area: 100-300 m²/g) (e.g., XC-72 manufactured by Cabot Corporation), and the catalyst is dispersed thereon with a catalyst:carbon weight ratio of 95:5. The solvent is a mixture of isopropyl alcohol:water=2:1 (by weight).

While ultrasonicating the suspension, a 10 μl portion thereof is collected and is quickly dropped onto a glassy carbon electrode (diameter: 5.2 mm) and dried at 120° C. for 5 minutes to form a fuel cell catalyst layer containing the catalyst on the glassy carbon electrode. The dropping and drying operations are repeated until at least 1.0 mg of the fuel cell catalyst layer is formed on the carbon electrode surface.

Subsequently, 10 μl of NAFION (registered trademark) (a 5% NAFION (registered trademark) solution (DE521) manufactured by Du Pont Kabushiki Kaisha) diluted ten times with pure water is dropped onto the fuel cell catalyst layer and is dried at 120° C. for 1 hour.

The electrode manufactured above is polarized in a 0.5 mol/dm$^3$ sulfuric acid solution at 30° C. under an oxygen atmosphere or a nitrogen atmosphere at a potential scanning rate of 5 mV/sec, thereby recording a current-potential curve. As a reference, a reversible hydrogen electrode is polarized in a sulfuric acid solution of the same concentration. In the current-potential curve, the potential at which the reduction current starts to differ by 0.5 μA/cm$^2$ or more between the polarization under the oxygen atmosphere and that under the nitrogen atmosphere is obtained as the oxygen reduction onset potential.

If the oxygen reduction onset potential is less than 0.7 V (vs. NHE), the use of the catalyst in a fuel cell cathode may cause the generation of hydrogen peroxide. For favorable oxygen reduction, the oxygen reduction onset potential is preferably 0.85 V (vs. NHE) or above. A higher oxygen reduction onset potential is more preferable. The upper limit of the oxygen reduction onset potential is not particularly limited but is theoretically 1.23 V (vs. NHE).

The fuel cell catalyst layer according to the invention that is prepared using the inventive catalyst is preferably used in an acidic electrolyte at a potential of not less than 0.4 V (vs. NHE). The upper limit of the potential depends on the stability of the electrode. The electrode according to the invention may be used at as high a potential as about 1.23 V (vs. NHE) which is the oxygen generation potential.

At a potential of less than 0.4 V (vs. NHE), the compound can exist stably but oxygen cannot be reduced favorably. Catalyst layers having such a low potential are not useful as fuel cell catalyst layers used in membrane electrode assemblies for fuel cells.

<Catalyst Production Processes>

The processes for producing the catalysts of the invention are not particularly limited. An exemplary process includes a step ([metal oxycarbonitride production step]) of obtaining the metal oxycarbonitride from a metal carbonitride containing the metal M and titanium. In detail, the process according to an embodiment of the invention includes a step of obtaining the metal oxycarbonitride containing titanium and at least one metal M selected from silver, calcium, strontium, yttrium, ruthenium, lanthanum, praseodymium, neodymium, promethium, samarium, europium, gadolinium, terbium, dysprosium, holmium, erbium, thulium, ytterbium and lutetium, by heat treating in an oxygen-containing mixture gas a metal carbonitride containing titanium and at least one metal M selected from silver, calcium, strontium, yttrium, ruthenium, lanthanum, praseodymium, neodymium, promethium, samarium, europium, gadolinium, terbium, dysprosium, holmium, erbium, thulium, ytterbium and lutetium.

[Metal Carbonitride Production Step]

The metal carbonitride used in the above step ([metal oxycarbonitride production step]) may be produced by a step (step 1) of heat treating a mixture that includes a compound containing the metal M and a compound containing titanium to produce the metal carbonitride. In particular, the metal carbonitride is preferably obtained by a step (step 1a) of heat treating a mixture that includes a metal M oxide, titanium oxide and carbon in a nitrogen atmosphere to produce the metal carbonitride.

(Step 1)

In the (step 1), a mixture that includes a compound containing the metal M and a compound containing titanium is heat treated to produce the metal carbonitride (as a heat treatment product).

In the production of the metal carbonitride, the heat treatment temperature is usually in the range of 500° C. to 2200° C., preferably 600° C. to 2200° C., and more preferably 800° C. to 2000° C. This heat treatment temperature is preferable in that high crystallinity and homogeneity are obtained. The heat treatment at temperatures below 500° C. tends to result in deteriorations in crystallinity and homogeneity. Heating at temperatures above 2200° C. tends to result in excessive sintering and crystal growth. Nitrogen for the synthesis of the carbonitride may be supplied to the reaction by feeding nitrogen gas or a nitrogen compound-containing mixture gas.

Examples of the metal M-containing compounds as materials include oxides, carbides, nitrides, carbonates, nitrates, carboxylates such as acetates, oxalates and citrates, and phosphates.

Examples of the oxides include silver oxide, calcium oxide, calcium hydroxide, strontium oxide, yttrium oxide, ruthenium oxide, lanthanum oxide, praseodymium oxide, neodymium oxide, promethium oxide, samarium oxide, europium oxide, gadolinium oxide, terbium oxide, dysprosium oxide, holmium oxide, erbium oxide, thulium oxide, ytterbium oxide and lutetium oxide.

Examples of the carbides include silver carbide, calcium carbide, strontium carbide, yttrium carbide, ruthenium carbide, lanthanum carbide, praseodymium carbide, neodymium carbide, promethium carbide, samarium carbide, europium carbide, gadolinium carbide, terbium carbide, dysprosium carbide, holmium carbide, erbium carbide, thulium carbide, ytterbium carbide and lutetium carbide.

Examples of the nitrides include silver nitride, calcium nitride, strontium nitride, yttrium nitride, ruthenium nitride, lanthanum nitride, praseodymium nitride, neodymium nitride, promethium nitride, samarium nitride, europium nitride, gadolinium nitride, terbium nitride, dysprosium nitride, holmium nitride, erbium nitride, thulium nitride, ytterbium nitride and lutetium nitride.

Examples of the carbonates include silver carbonate, calcium carbonate, strontium carbonate, yttrium carbonate, ruthenium carbonate, lanthanum carbonate, praseodymium carbonate, neodymium carbonate, promethium carbonate, samarium carbonate, europium carbonate, gadolinium carbonate, terbium carbonate, dysprosium carbonate, holmium carbonate, erbium carbonate, thulium carbonate, ytterbium carbonate and lutetium carbonate. The number of the metal M-containing compounds that are used is not particularly limited. That is, one or two or more metal M-containing compounds may be used.

Examples of the titanium-containing compounds as materials include oxides, carbides, nitrides, carbonates, nitrates, acetates, oxalates, citrates, other carboxylates, phosphates and oxydichlorides.

Specific examples include TiO, $Ti_3O_4$, $TiO_2$, $Ti_3O_5$, $Ti_nO_{2n-1}$ (wherein n is an integer of 2 to 10), TiC, TiN, $TiCl_2O$ and $TiCl_4$. The titanium-containing compounds may be used singly, or two or more kinds may be used in combination. The structures of the titanium-containing compounds are not particularly limited. For example, a plurality of phases may be contained in a single particle.

The materials used in the step may include carbon.

Examples of the carbons include carbon, carbon blacks, graphites, black leads, activated carbons, carbon nanotubes, carbon nanofibers, carbon nanohorns and fullerenes. The carbons preferably have smaller particle diameters. Such carbon particles have a larger specific surface area and react easily with the oxides. A suitable carbon material is carbon black (specific surface area: 100-300 m$^2$/g, for example XC-72 manufactured by Cabot Corporation).

The above-described materials may be used in any combination without limitation, and the obtainable metal carbonitride produced from the materials including the metal M-containing compound and the titanium-containing compound may be heat treated in an oxygen-containing mixture gas to give a metal oxycarbonitride catalyst which has a high oxygen reduction onset potential and high activity.

An appropriate metal carbonitride may be produced by controlling the amounts (the molar ratio) of the metal M-containing compound and the titanium-containing compound.

The use of the metal carbonitride that is produced with optimum amounts (molar ratio) of the materials tends to result in a metal oxycarbonitride that has a high oxygen reduction onset potential and high activity.

The mixture gas may be single nitrogen gas or nitrogen compound gas, or may be a mixture of nitrogen gas and a nitrogen compound gas. Further, nitrogen gas and/or a nitrogen compound gas may be used as a mixture with an inert gas. Examples of the inert gases include helium gas, neon gas, argon gas, krypton gas, xenon gas and radon gas. Examples of the nitrogen compounds include ammonia, nitrogen monoxide, nitrogen dioxide, nitrous oxide, dinitrogen trioxide, dinitrogen tetroxide, dinitrogen pentoxide, acetonitrile, acrylonitrile, aniline, pyrrole, monomethylamine, dimethylamine, trimethylamine, pyridine, imidazole, methanolamine, ethanolamine, formamide and dimethylformamide.

(Step 1a)

In a particular embodiment, the (step 1) is a (step 1a) in which a mixture that includes a metal M oxide, titanium oxide and carbon is heat treated in an atmosphere of nitrogen or a nitrogen compound-containing mixture gas to give the metal carbonitride (as a heat treatment product). The metal oxycarbonitride that is obtained through this step achieves particularly high catalytic activity.

In the production of the metal carbonitride, the heat treatment temperature is usually in the range of 600° C. to 2200° C., preferably 800° C. to 2000° C., and more preferably 1000° C. to 1900° C. This heat treatment temperature is preferable in that high crystallinity and homogeneity are obtained. The heat treatment at temperatures below 600° C. tends to result in deteriorations in crystallinity and homogeneity. Heating at temperatures above 2200° C. tends to result in sintering and crystal growth. Nitrogen for the synthesis of the carbonitride may be supplied to the reaction by feeding nitrogen gas or a nitrogen compound-containing mixture gas. Carbon for the synthesis of the carbonitride may be supplied from carbon that is used as a material.

Examples of the metal M oxides as materials in the (step 1a) include silver oxide, calcium oxide, strontium oxide, yttrium oxide, ruthenium oxide, lanthanum oxide, praseodymium oxide, neodymium oxide, promethium oxide, samarium oxide, europium oxide, gadolinium oxide, terbium oxide, dysprosium oxide, holmium oxide, erbium oxide, thulium oxide, ytterbium oxide and lutetium oxide. The metal M oxides may be used singly, or two or more kinds may be used in combination.

Examples of the titanium oxides as materials include TiO, Ti$_3$O$_4$, TiO$_2$, Ti$_3$O$_5$ and Ti$_n$O$_{2n-1}$ (wherein n is an integer of 2 to 10). The titanium oxides may be used singly, or two or more kinds may be used in combination. The structures of the titanium oxides are not particularly limited. For example, a plurality of phases may be contained in a single particle.

Examples of the carbons as materials in the (step 1a) include carbon, carbon blacks, graphites, black leads, activated carbons, carbon nanotubes, carbon nanofibers, carbon nanohorns and fullerenes. Of these, carbon black is particularly preferable. The carbons preferably have smaller particle diameters. Such carbon particles have a larger specific surface area and react easily with the oxides. A suitable carbon material is carbon black (specific surface area: 100-300 m$^2$/g, for example XC-72 manufactured by Cabot Corporation).

The above-described materials may be used in any combination without limitation. That is, any combination of the materials including the metal M oxide, the titanium oxide and the carbon may be heat treated in nitrogen gas or a nitrogen compound-containing mixture gas to give a metal carbonitride, and heat treating this metal carbonitride in an oxygen-containing mixture gas results in a metal oxycarbonitride catalyst which has a high oxygen reduction onset potential and high activity.

An appropriate metal carbonitride may be produced by controlling the amounts (the molar ratio) of the metal M oxide, the titanium oxide and the carbon.

The amounts (the molar ratio) are usually such that the metal M oxide and the carbon are used at 0.0001 to 1 mol and 1 to 10 mol, respectively, based on 1 mol of the titanium oxide, preferably such that the metal M oxide and the carbon are used at 0.001 to 0.4 mol and 2 to 6 mol, respectively, based on 1 mol of the titanium oxide, and more preferably such that the metal M oxide and the carbon are used at 0.001 to 0.1 mol and 2 to 3 mol, respectively, based on 1 mol of the titanium oxide. When the metal M is calcium, strontium, yttrium, lanthanum, praseodymium, neodymium, promethium, samarium, europium, gadolinium, terbium, dysprosium, holmium, erbium, thulium, ytterbium or lutetium, the amount of the metal M oxide is preferably 0.001 to 0.05 mol, and more preferably 0.005 to 0.03 mol based on 1 mol of the titanium oxide. These molar ratios tend to ensure that the obtainable metal carbonitride gives a metal oxycarbonitride having a high oxygen reduction onset potential and high activity.

The mixture gas may be single nitrogen gas or nitrogen compound gas, or may be a mixture of nitrogen gas and a nitrogen compound gas. Further, nitrogen gas and/or a nitrogen compound gas may be used as a mixture with an inert gas. Examples of the inert gases include helium gas, neon gas, argon gas, krypton gas, xenon gas and radon gas. Examples of the nitrogen compounds include ammonia, nitrogen monoxide, nitrogen dioxide, nitrous oxide, dinitrogen trioxide, dinitrogen tetroxide, dinitrogen pentoxide, acetonitrile, acrylonitrile, aniline, pyrrole, monomethylamine, dimethylamine, trimethylamine, pyridine, imidazole, methanolamine, ethanolamine, formamide and dimethylformamide.

[Metal Oxycarbonitride Production Step]

Next, there will be described a step ([metal oxycarbonitride production step]) of obtaining the metal oxycarbonitride from a metal carbonitride containing the metal M and titanium. In detail, there will be described a step (step (2) or step (2a)) of obtaining the metal oxycarbonitride by heat treating the metal carbonitride from the step (1) or the step (1a) in an oxygen-containing mixture gas.

The oxygen-containing mixture gas contains an inert gas in addition to oxygen gas. Examples of the inert gases include nitrogen gas, helium gas, neon gas, argon gas, krypton gas, xenon gas and radon gas. Nitrogen gas and argon gas are particularly preferable because of their relatively easy availability.

The oxygen-containing mixture gas may further contain hydrogen gas.

In this step, the oxygen concentration in the oxygen-containing mixture gas depends on the heat treatment time and the heat treatment temperature, but is preferably 0.005 to 10% by volume, more preferably 0.1 to 7.0% by volume, still more preferably 0.5 to 5% by volume, particularly preferably 1.0 to 5% by volume, and optimally 1.5 to 2.5% by volume. This oxygen concentration is preferable in that a homogeneous oxycarbonitride is obtained. If the oxygen concentration is less than 0.005% by volume, the oxidation tends to fail. If the concentration is in excess of 10% by volume, the oxidation tends to proceed excessively.

In the case where the oxygen-containing mixture gas in this step contains hydrogen, the hydrogen concentration depends on the heat treatment time and the heat treatment temperature, but is preferably 0.01 to 10% by volume, and particularly preferably 0.1 to 5% by volume. This hydrogen concentration is preferable in that a homogeneous oxycarbonitride is obtained. A hydrogen concentration in excess of 10% by volume tends to result in excessive reduction.

When the oxygen-containing mixture gas is composed of oxygen gas and the inert gas, the concentration of the inert gas is the balance after the deduction of the above oxygen concentration. When the oxygen-containing mixture gas contains oxygen gas, the inert gas and hydrogen gas, the concentration of the inert gas is the balance after the deduction of the above oxygen concentration and hydrogen concentration.

In this step, the heat treatment is usually performed at a temperature in the range of 400 to 1500° C., preferably 400 to 1400° C., and more preferably 600 to 1200° C. This heat treatment temperature is preferable in that a homogeneous metal oxycarbonitride is obtained. If the heat treatment temperature is below 400° C., the oxidation tends not to proceed. The heat treatment at a temperature above 1500° C. tends to result in excessive oxidation and crystal growth.

The heat treatment methods in this step include a stationary method, a stirring method, a dropping method and a powder capturing method.

In the dropping method, an induction furnace is heated to the predetermined heat treatment temperature while passing the inert gas containing the trace amount of oxygen through the furnace; a thermal equilibrium is maintained at the temperature and the metal carbonitride is dropped and heated in a crucible which is the heating zone in the furnace. The dropping method is advantageous in that the aggregation and growth of particles of the metal carbonitride are minimized.

In the powder capturing method, the metal carbonitride is caused to suspend as particles in the inert gas atmosphere containing the trace amount of oxygen, and the metal carbonitride is captured and heated in a vertical tubular furnace controlled at the predetermined heat treatment temperature.

In the dropping method, the heat treatment time for the metal carbonitride is usually from 0.5 to 10 minutes, and preferably from 1.0 to 3 minutes. This heat treatment time is preferable in that a homogeneous metal oxycarbonitride tends to be obtained. The heat treatment for less than 0.5 minutes tends to result in partial formation of the metal oxycarbonitride. If the heat treatment time exceeds 10 minutes, the oxidation tends to proceed excessively.

In the powder capturing method, the heat treatment time for the metal carbonitride is from 0.2 seconds to 1 minute, and preferably from 0.5 to 10 seconds. This heat treatment time is preferable in that a homogeneous metal oxycarbonitride tends to be obtained. The heat treatment for less than 0.2 seconds tends to result in partial formation of the metal oxycarbonitride. If the heat treatment time exceeds 1 minute, the oxidation tends to proceed excessively. When the heat treatment is performed in a tubular furnace, the heat treatment time for the metal carbonitride may be from 0.1 to 10 hours, and preferably from 0.5 to 5 hours. This heat treatment time is preferable in that a homogeneous metal oxycarbonitride tends to be obtained. The heat treatment for less than 0.1 hours tends to result in partial formation of the metal oxycarbonitride. If the heat treatment time exceeds 10 hours, the oxidation tends to proceed excessively.

In the invention, the metal oxycarbonitride obtained by any of the aforementioned processes may be used directly as the catalyst according to the invention. In another embodiment, the metal oxycarbonitride may be crushed into finer particles.

The methods for crushing the metal oxycarbonitride include roll milling, ball milling, medium stirring milling, and crushing with an air flow crusher, a mortar or a crushing tank. To crush the metal oxycarbonitride into finer particles, an air flow crusher is preferably used. To facilitate the crushing in small amounts, the use of a mortar is preferable.

<Uses>

The catalysts according to the present invention may be used as alternative catalysts to platinum catalysts.

For example, the catalysts of the invention may be used as fuel cell catalysts, exhaust gas treatment catalysts and organic synthesis catalysts.

A fuel cell catalyst layer according to the invention contains the above catalyst.

A fuel cell catalyst layer is either an anode catalyst layer or a cathode catalyst layer. The catalyst of the invention may be used in any of these layers. Because the catalyst of the invention has excellent durability and high oxygen reducing ability, it is preferably used in a cathode catalyst layer.

In a preferred embodiment, the fuel cell catalyst layer of the invention further contains electron conductive particles. When the fuel cell catalyst layer containing the catalyst further contains electron conductive particles, the reduction current may be further increased. The increase in the reduction current is probably because the electron conductive particles establish electrical contacts within the catalyst to induce electrochemical reaction.

The electron conductive particles may be usually used as a carrier for the catalyst.

Examples of the electron conductive particles include carbons, conductive polymers, conductive ceramics, metals and conductive inorganic oxides such as tungsten oxide and iridium oxide. These substances may be used singly or in combination with one another. In particular, because carbon has a large specific surface area, it is preferable to use carbon alone or a mixture of carbon and other electron conductive particles. That is, the fuel cell catalyst layer according to a preferred embodiment contains the catalyst and carbon.

Examples of the carbons include carbon blacks, graphites, black leads, activated carbons, carbon nanotubes, carbon nanofibers, carbon nanohorns and fullerenes. If the particle diameter of carbon is excessively small, the carbon may not be able to form an electron conductive path. If the particle diameter is excessively large, the fuel cell catalyst layer tends to reduce gas diffusion properties or the catalyst usage rate tends to be lowered. Thus, the carbon particle diameter is preferably in the range of 10 to 1000 nm, and more preferably 20 to 100 nm.

When the electron conductive particles are carbon, the weight ratio of the catalyst and the carbon (catalyst:electron conductive particles) is preferably in the range of 4:1 to 1000:1.

The conductive polymers are not particularly limited. Examples thereof include polyacetylene, poly-p-phenylene, polyaniline, polyalkylaniline, polypyrrole, polythiophene, polyindole, poly-1,5-diaminoanthraquinone, polyaminodiphenyl, poly(o-phenylenediamine), poly(quinolinium) salt, polypyridine, polyquinoxaline and polyphenylquinoxaline. Of these, polypyrrole, polyaniline and polythiophene are preferred, and polypyrrole is more preferred.

Preferably, the fuel cell catalyst layer of the invention further contains a polymer electrolyte.

The polymer electrolytes are not particularly limited as long as they are commonly used in fuel cell catalyst layers. Specific examples include perfluorocarbon polymers having a sulfonic acid group (such as NAFION (registered trademark) (a 5% NAFION (registered trademark) solution (DE521) manufactured by Du Pont Kabushiki Kaisha), hydrocarbon polymer compounds having a sulfonic acid group, polymer compounds doped with inorganic acids such as phosphoric acid, organic/inorganic hybrid polymers partially substituted with proton conductive functional groups, and proton conductors composed of a polymer matrix impregnated with a phosphoric acid solution or a sulfuric acid solution. Of these, NAFION (registered trademark) (a 5% NAFION (registered trademark) solution (DE521) manufactured by Du Pont Kabushiki Kaisha) is preferable.

The fuel cell catalyst layer according to the present invention may be used as an anode catalyst layer or a cathode catalyst layer. The fuel cell catalyst layer of the invention contains the catalyst that has high oxygen reducing ability and is resistant to corrosion in an acidic electrolyte even at high potential. Accordingly, the catalyst layer of the invention is suited for use in a fuel cell cathode (as a cathode catalyst layer). In particular, the catalyst layer is suitably provided in a cathode of a membrane electrode assembly in a polymer electrolyte fuel cell.

The catalyst may be dispersed on the electron conductive particles as the carrier by methods such as airborne dispersion methods and in-liquid dispersion methods. The in-liquid dispersion methods are preferable because the dispersion of the catalyst and the electron conductive particles in a solvent can be used in the production of the fuel cell catalyst layer. Exemplary in-liquid dispersion methods include an orifice-choked flow method, a rotational shear flow method and an ultrasonic method. The solvents used in the in-liquid dispersion methods are not particularly limited as long as the catalyst and the electron conductive particles are not corroded and are dispersed therein. Volatile liquid organic solvents and water are generally used.

When the catalyst is dispersed on the electron conductive particles, the electrolyte described above and a dispersant may be dispersed together therewith.

The fuel cell catalyst layer may be formed by any methods without limitation. For example, a suspension containing the catalyst, the electron conductive particles and the electrolyte may be applied to an electrolyte membrane or a gas diffusion layer described later. The application methods include dipping, screen printing, roll coating and spraying. In another embodiment, a suspension containing the catalyst, the electron conductive particles and the electrolyte may be applied or filtered onto a substrate to form a fuel cell catalyst layer, and the catalyst layer may be transferred to an electrolyte membrane.

An electrode according to the present invention contains the fuel cell catalyst layer and a porous support layer.

The electrode of the invention may be used as a cathode or an anode. Because the inventive electrode has excellent durability and high catalytic performance, it is more advantageous from the industrial viewpoint that the electrode be used as a cathode.

The porous support layer is a layer which diffuses gas (hereinafter, also referred to as "gas diffusion layer"). The gas diffusion layers are not particularly limited as long as they have electron conductivity, high gas diffusion properties and high corrosion resistance. Carbon-based porous materials such as carbon paper and carbon cloth, and stainless steel and anticorrosive-coated aluminum foils for weight reduction may be generally used.

A membrane electrode assembly of the invention has a cathode, an anode and an electrolyte membrane between the cathode and the anode. The cathode and/or the anode is the electrode described hereinabove.

The electrolyte membranes may be general perfluorosulfonic acid electrolyte membranes or hydrocarbon electrolyte membranes. Further, polymer fine-pore membranes impregnated with liquid electrolyte, or porous membranes filled with polymer electrolyte may be used.

A fuel cell according to the present invention has the membrane electrode assembly described above.

An electrode reaction in a fuel cell takes place at a three-phase interface (electrolyte-electrode catalyst-reaction gas). Fuel cells are classified according to the used electrolytes into several types such as molten carbonate fuel cells (MCFC), phosphoric acid fuel cells (PAFC), solid oxide fuel cells (SOFC) and polymer electrolyte fuel cells (PEFC). In particular, the membrane electrode assembly of the invention may be preferably used in a polymer electrolyte fuel cell.

EXAMPLES

The present invention will be described in detail by presenting examples hereinbelow without limiting the scope of the invention.

In Examples and Comparative Examples, measurements were carried out by the following methods.
[Analytical Methods]
1. Powder X-Ray Diffractometry Samples were analyzed by powder X-ray diffractometry using Rotaflex manufactured by Rigaku Corporation.

In the powder X-ray diffractometry of each sample, the number of diffraction peaks was counted in a manner such that a signal which was detected with a signal (S) to noise (N) ratio (S/N) of 2 or more was regarded as a diffraction peak. The noise (N) was the width of the baseline.

2. Elemental Analysis

Carbon: Approximately 0.1 g of a sample was weighed out and analyzed with EMIA-110 manufactured by HORIBA, Ltd.

Nitrogen and oxygen: Approximately 0.1 g of a sample sealed in a Ni cup was analyzed with an ON analyzer.

Titanium and other metals M: Approximately 0.1 g of a sample was weighed on a platinum dish, and an acid was added thereto. The sample was then thermally decomposed. The thermal decomposition product was collected to a predetermined volume, diluted and analyzed by ICP-MS.

Example 1

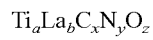

1. Preparation of Catalyst

Carbon (Vulcan 72 manufactured by Cabot Corporation) weighing 1.33 g was crushed sufficiently and mixed with 3.53 g of titanium oxide (Super-Titania F6 manufactured by Showa Denko K.K.) and 0.144 g of lanthanum oxide ($La_2O_3$, manufactured by Shin-Etsu Chemical Co., Ltd.). The resultant powder mixture was heat treated in a tubular furnace in a nitrogen atmosphere at 1800° C. for 3 hours to give 2.52 g of a carbonitride (1) containing titanium and lanthanum (approximately 2 mol % with respect to 100 mol % of titanium). The carbonitride was crushed in a mortar.

The carbonitride (1) weighing 1.0 g was heat treated in a tubular furnace at 1000° C. for 3 hours while passing a mixture gas containing 2% by volume of oxygen gas and 4% by volume of hydrogen gas (the balance was nitrogen gas). As a result, 1.27 g of an oxycarbonitride containing lanthanum and titanium (hereinafter, also referred to as "catalyst (1)") was obtained. The results of the elemental analysis of the catalyst (1) are described in Table 1.

A powder X-ray diffraction spectrum of the catalyst (1) is shown in FIG. 1.

2. Production of Fuel Cell Electrode

The oxygen reducing ability was determined in the following manner. The catalyst (1) in an amount of 0.095 g and carbon (XC-72 manufactured by Cabot Corporation) weighing 0.005 g were added to 10 g of a solution consisting of isopropyl alcohol:pure water=2:1 by weight. The mixture was ultrasonically stirred to give a suspended mixture. The mixture in a volume of 10 μl was applied onto a glassy carbon electrode (diameter: 5.2 mm, manufactured by Tokai Carbon Co., Ltd.) and was dried at 120° C. for 5 minutes. These dropping and drying operations were repeated until at least 1.0 mg of a fuel cell catalyst layer was formed on the carbon electrode. Subsequently, 10 μl of NAFION (registered trademark) (a 5% NAFION (registered trademark) solution (DE521) manufactured by Du Pont Kabushiki Kaisha) diluted ten times with pure water was applied thereon and was dried at 120° C. for 1 hour. A fuel cell electrode (1) was thus manufactured.

3. Evaluation of Oxygen Reducing Ability

The fuel cell electrode (1) manufactured above was evaluated for catalytic performance (oxygen reducing ability) as described below.

The fuel cell electrode (1) was polarized in a 0.5 mol/dm$^3$ sulfuric acid solution at 30° C. under an oxygen atmosphere or a nitrogen atmosphere at a potential scanning rate of 5 mV/sec, thereby recording a current-potential curve. As a reference, a reversible hydrogen electrode was polarized in a sulfuric acid solution of the same concentration.

In the current-potential curve obtained, the potential at which the reduction current started to differ by 0.5 μA/cm$^2$ or more between the polarization under the oxygen atmosphere and that under the nitrogen atmosphere was obtained as the oxygen reduction onset potential. The difference between the reduction currents was obtained as the oxygen reduction current.

The catalytic performance (oxygen reducing ability) of the fuel cell electrode (1) was evaluated based on the oxygen reduction onset potential and the oxygen reduction current.

The higher the oxygen reduction onset potential and the higher the oxygen reduction current, the higher the catalytic performance (oxygen reducing ability) of the fuel cell electrode (1).

Figure 15:
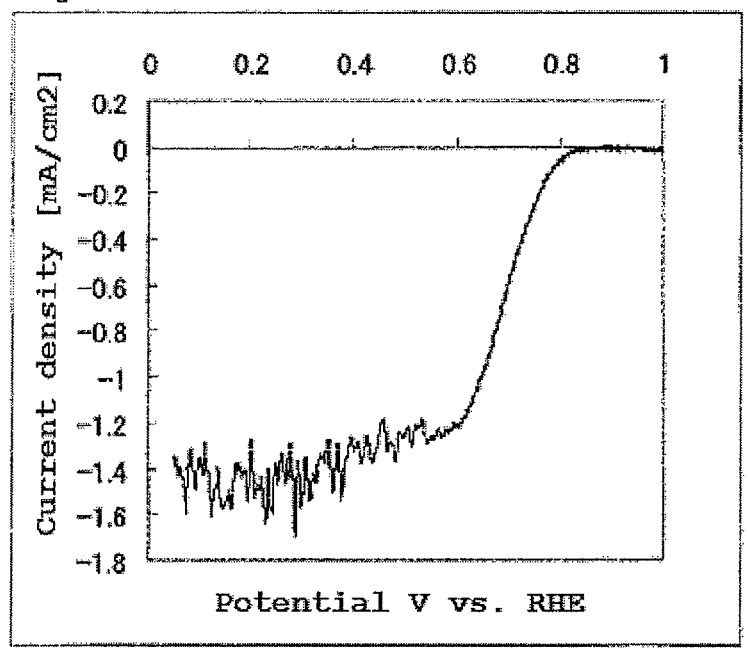
FIG. 15 is a graph showing an evaluation of the oxygen reducing ability of a fuel cell electrode (1) in Example 1.

The oxygen reduction current-oxygen reduction potential curve (hereinafter, referred to as current-potential curve) recorded during the above measurement is shown in FIG. 15.

The fuel cell electrode (1) manufactured in Example 1 had an oxygen reduction onset potential of 0.89 V (vs. NHE) and was found to have high oxygen reducing ability.

Example 2

1. Preparation of Catalyst

Carbon (Vulcan 72 manufactured by Cabot Corporation) weighing 1.34 g was crushed sufficiently and mixed with 3.57 g of titanium oxide (Super-Titania F6 manufactured by Showa Denko K.K.) and 0.077 g of samarium oxide ($Sm_2O_3$, manufactured by Shin-Etsu Chemical Co., Ltd.). The resultant powder mixture was heat treated in a tubular furnace in a nitrogen atmosphere at 1700° C. for 3 hours to give 2.48 g of a carbonitride (2) containing titanium and samarium (approximately 1 mol % with respect to 100 mol % of titanium). The carbonitride was crushed in a mortar.

The carbonitride (2) weighing 1.00 g was heat treated in the same manner as in Example 1 to give 1.22 g of an oxycarbonitride containing titanium and samarium (hereinafter, also referred to as "catalyst (2)"). The results of the elemental analysis of the catalyst (2) are described in Table 1.

Figure 2:
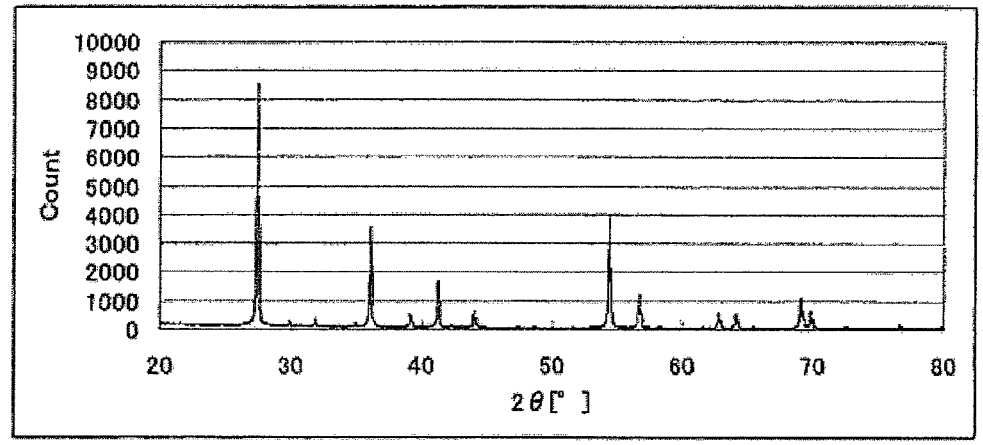
FIG. 2 is a powder X-ray diffraction spectrum of an oxycarbonitride (2) in Example 2.

A powder X-ray diffraction spectrum of the catalyst (2) is shown in FIG. 2.

2. Production of Fuel Cell Electrode

A fuel cell electrode (2) was manufactured in the same manner as in Example 1, except that the catalyst (2) was used.

3. Evaluation of Oxygen Reducing Ability

The catalytic performance (oxygen reducing ability) was evaluated in the same manner as in Example 1, except that the fuel cell electrode (2) was used.

Figure 16:
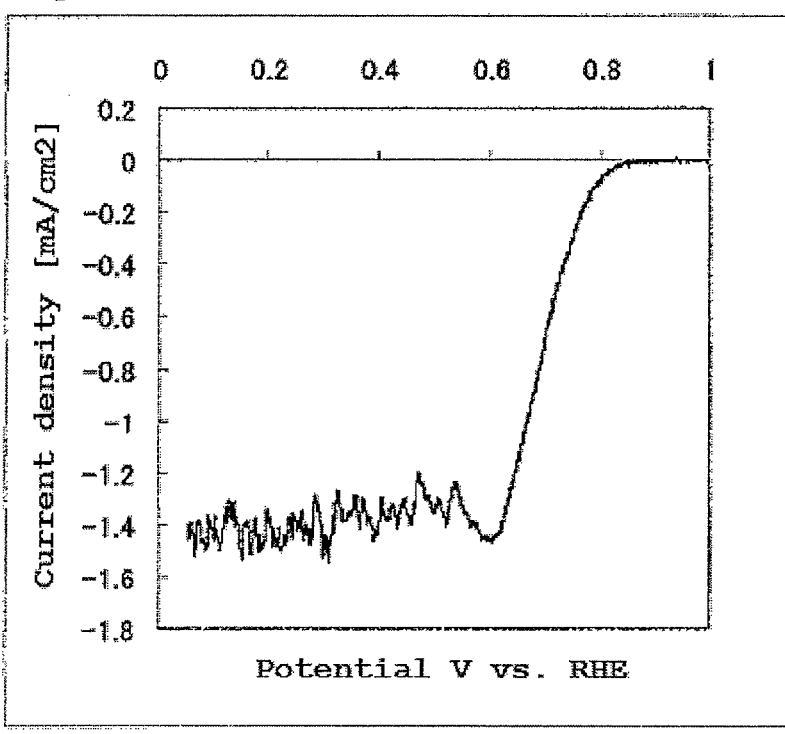
FIG. 16 is a graph showing an evaluation of the oxygen reducing ability of a fuel cell electrode (2) in Example 2.

The current-potential curve recorded during the measurement is shown in FIG. 16.

The fuel cell electrode (2) manufactured in Example 2 had an oxygen reduction onset potential of 0.90 V (vs. NHE) and was found to have high oxygen reducing ability.

Example 3

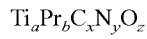

1. Preparation of Catalyst

Carbon (Vulcan 72 manufactured by Cabot Corporation) weighing 1.33 g was crushed sufficiently and mixed with 3.52 g of titanium oxide (Super-Titania F6 manufactured by Showa Denko K.K.) and 0.144 g of praseodymium oxide ($Pr_6O_{11}$, manufactured by Shin-Etsu Chemical Co., Ltd.). The resultant powder mixture was heat treated in a tubular furnace in a nitrogen atmosphere at 1700° C. for 3 hours to give 2.53 g of a carbonitride (3) containing titanium and praseodymium (approximately 2 mol % with respect to 100 mol % of titanium). The carbonitride was crushed in a mortar.

The carbonitride (3) weighing 1.00 g was heat treated in the same manner as in Example 1 to give 1.21 g of an oxycarbonitride containing titanium and praseodymium (hereinafter, also referred to as "catalyst (3)"). The results of the elemental analysis of the catalyst (3) are described in Table 1.

Figure 3:
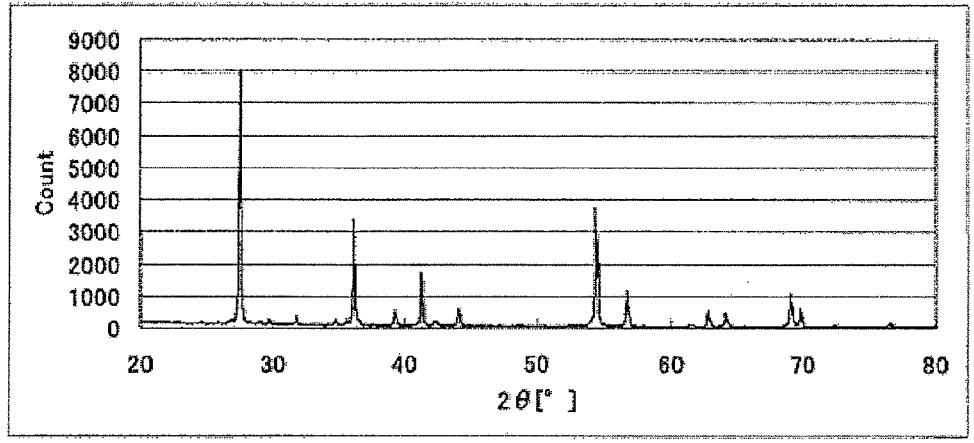
FIG. 3 is a powder X-ray diffraction spectrum of an oxycarbonitride (3) in Example 3.

A powder X-ray diffraction spectrum of the catalyst (3) is shown in FIG. 3.

2. Production of Fuel Cell Electrode

A fuel cell electrode (3) was manufactured in the same manner as in Example 1, except that the catalyst (3) was used.

3. Evaluation of Oxygen Reducing Ability

The catalytic performance (oxygen reducing ability) was evaluated in the same manner as in Example 1, except that the fuel cell electrode (3) was used.

Figure 17:
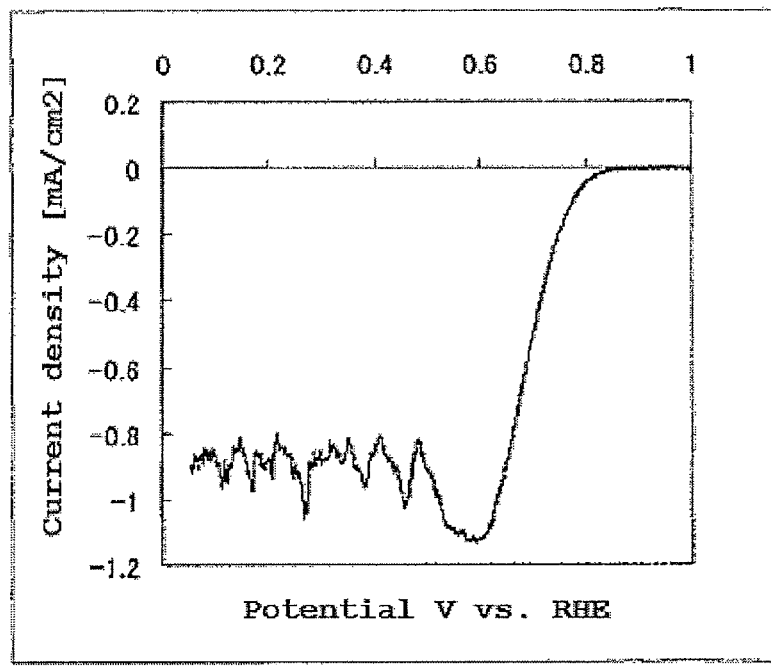
FIG. 17 is a graph showing an evaluation of the oxygen reducing ability of a fuel cell electrode (3) in Example 3.

The current-potential curve recorded during the measurement is shown in FIG. 17.

The fuel cell electrode (3) manufactured in Example 3 had an oxygen reduction onset potential of 0.89 V (vs. NHE) and was found to have high oxygen reducing ability.

Example 4

1. Preparation of Catalyst

Carbon (Vulcan 72 manufactured by Cabot Corporation) weighing 1.33 g was crushed sufficiently and mixed with 3.53 g of titanium oxide (Super-Titania F6 manufactured by Showa Denko K.K.) and 0.150 g of neodymium oxide (Nd$_2$O$_3$, manufactured by Shin-Etsu Chemical Co., Ltd.). The resultant powder mixture was heat treated in a tubular furnace in a nitrogen atmosphere at 1700° C. for 3 hours to give 2.50 g of a carbonitride (4) containing titanium and neodymium (approximately 2 mol % with respect to 100 mol % of titanium). The carbonitride was crushed in a mortar.

The carbonitride (4) weighing 1.00 g was heat treated in the same manner as in Example 1 to give 1.23 g of an oxycarbonitride containing titanium and neodymium (hereinafter, also referred to as "catalyst (4)"). The results of the elemental analysis of the catalyst (4) are described in Table 1.

Figure 4:
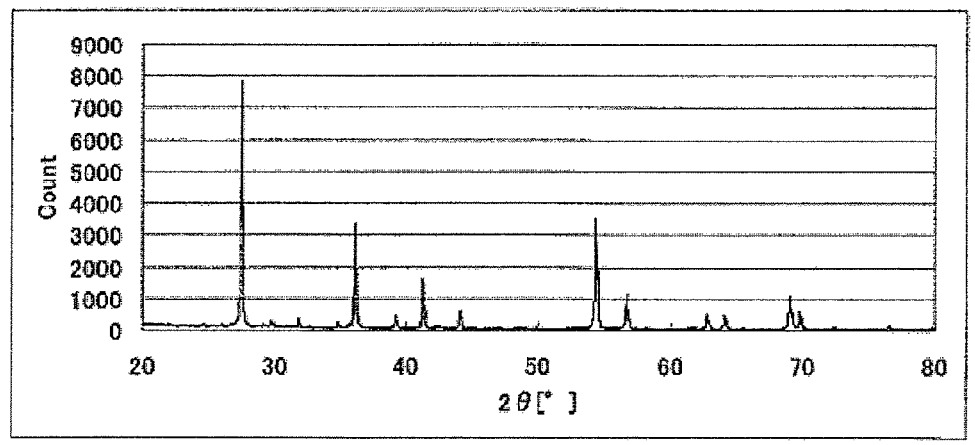
FIG. 4 is a powder X-ray diffraction spectrum of an oxycarbonitride (4) in Example 4.

A powder X-ray diffraction spectrum of the catalyst (4) is shown in FIG. 4.

2. Production of Fuel Cell Electrode

A fuel cell electrode (4) was manufactured in the same manner as in Example 1, except that the catalyst (4) was used.

3. Evaluation of Oxygen Reducing Ability

The catalytic performance (oxygen reducing ability) was evaluated in the same manner as in Example 1, except that the fuel cell electrode (4) was used.

Figure 18:
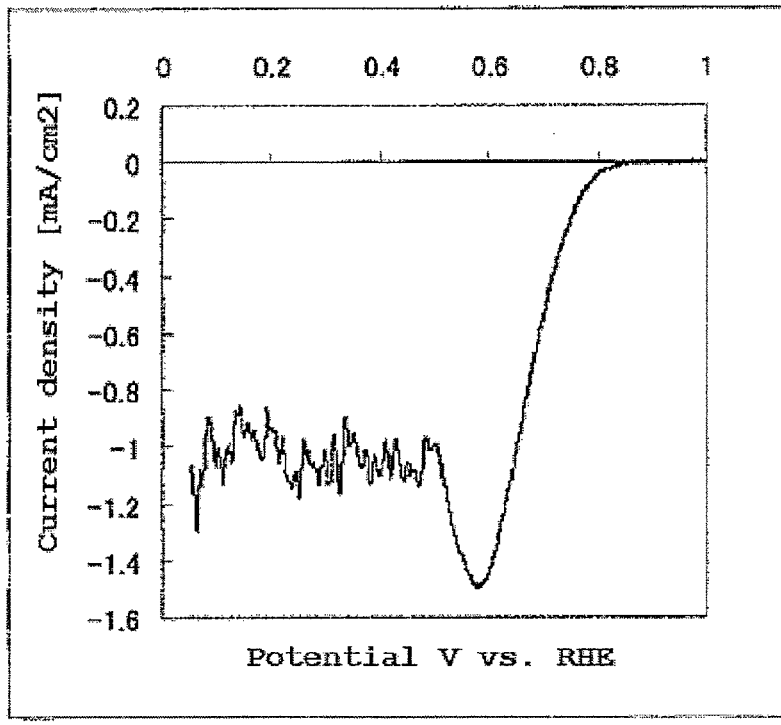
FIG. 18 is a graph showing an evaluation of the oxygen reducing ability of a fuel cell electrode (4) in Example 4.

The current-potential curve recorded during the measurement is shown in FIG. 18.

The fuel cell electrode (4) manufactured in Example 4 had an oxygen reduction onset potential of 0.88 V (vs. NHE) and was found to have high oxygen reducing ability.

Example 5

Ti$_a$Eu$_b$C$_x$N$_y$O$_z$

1. Preparation of Catalyst

Carbon (Vulcan 72 manufactured by Cabot Corporation) weighing 1.32 g was crushed sufficiently and mixed with 3.52 g of titanium oxide (Super-Titania F6 manufactured by Showa Denko K.K.) and 0.155 g of europium oxide (Eu$_2$O$_3$, manufactured by Shin-Etsu Chemical Co., Ltd.). The resultant powder mixture was heat treated in a tubular furnace in a nitrogen atmosphere at 1700° C. for 3 hours to give 2.49 g of a carbonitride (5) containing titanium and europium (approximately 2 mol % with respect to 100 mol % of titanium). The carbonitride was crushed in a mortar.

The carbonitride (5) weighing 1.00 g was heat treated in the same manner as in Example 1 to give 1.25 g of an oxycarbonitride containing titanium and europium (hereinafter, also referred to as "catalyst (5)"). The results of the elemental analysis of the catalyst (5) are described in Table 1.

Figure 5:
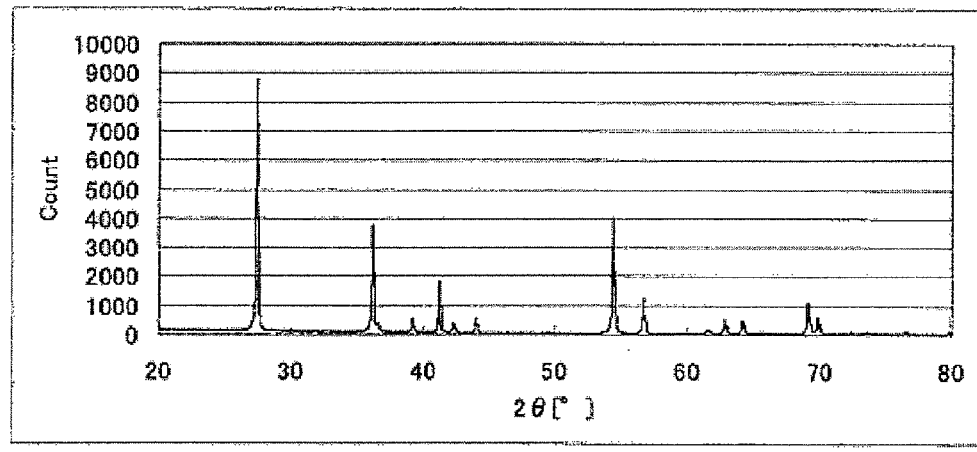
FIG. 5 is a powder X-ray diffraction spectrum of an oxycarbonitride (5) in Example 5.

A powder X-ray diffraction spectrum of the catalyst (5) is shown in FIG. 5.

2. Production of Fuel Cell Electrode

A fuel cell electrode (5) was manufactured in the same manner as in Example 1, except that the catalyst (5) was used.

3. Evaluation of Oxygen Reducing Ability

The catalytic performance (oxygen reducing ability) was evaluated in the same manner as in Example 1, except that the fuel cell electrode (5) was used.

Figure 19:
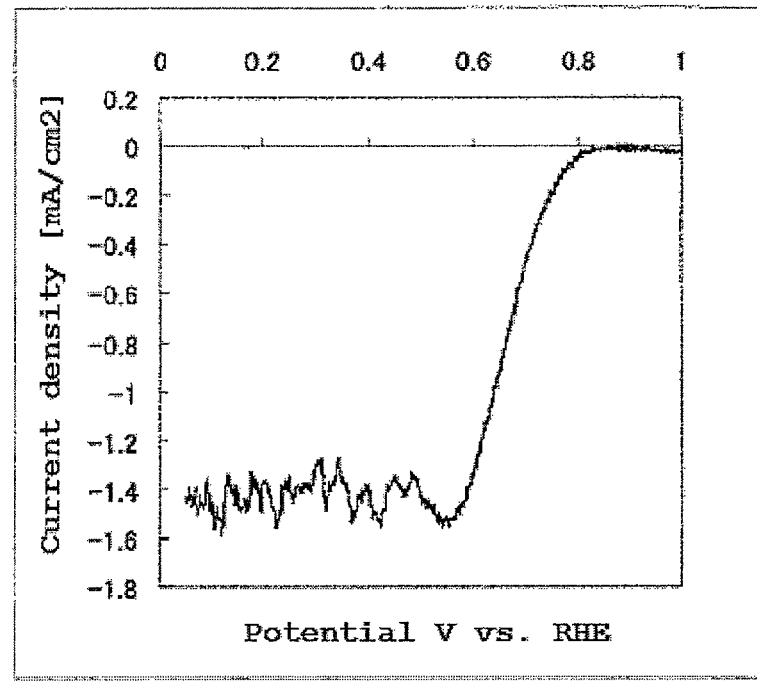
FIG. 19 is a graph showing an evaluation of the oxygen reducing ability of a fuel cell electrode (5) in Example 5.

The current-potential curve recorded during the measurement is shown in FIG. 19.

The fuel cell electrode (5) manufactured in Example 5 had an oxygen reduction onset potential of 0.88 V (vs. NHE) and was found to have high oxygen reducing ability.

Example 6

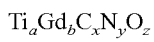
Ti$_a$Gd$_b$C$_x$N$_y$O$_z$

1. Preparation of Catalyst

Carbon (Vulcan 72 manufactured by Cabot Corporation) weighing 1.32 g was crushed sufficiently and mixed with 3.52 g of titanium oxide (Super-Titania F6 manufactured by Showa Denko K.K.) and 0.160 g of gadolinium oxide (Gd$_2$O$_3$, manufactured by Shin-Etsu Chemical Co., Ltd.). The resultant powder mixture was heat treated in a tubular furnace in a nitrogen atmosphere at 1700° C. for 3 hours to give 2.55 g of a carbonitride (6) containing titanium and gadolinium (approximately 2 mol % with respect to 100 mol % of titanium). The carbonitride was crushed in a mortar.

The carbonitride (6) weighing 1.00 g was heat treated in the same manner as in Example 1 to give 1.25 g of an oxycarbonitride containing titanium and gadolinium (hereinafter, also referred to as "catalyst (6)"). The results of the elemental analysis of the catalyst (6) are described in Table 1.

Figure 6:
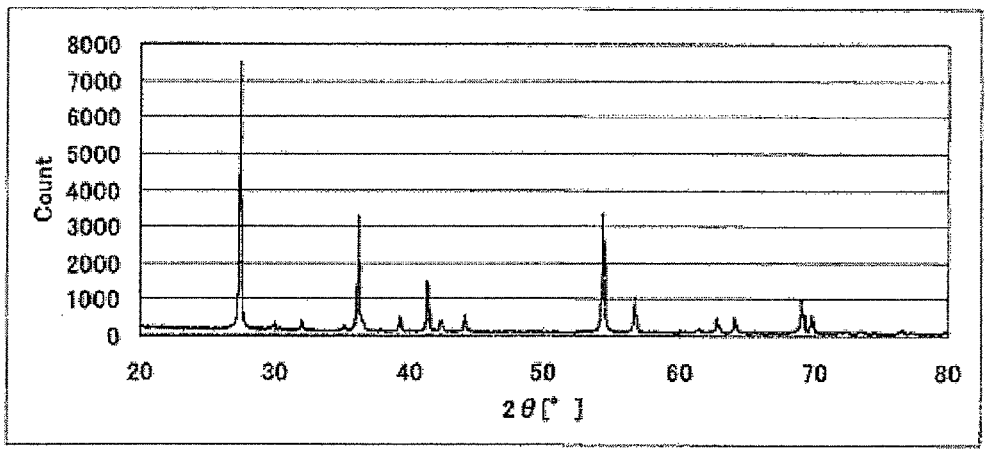
FIG. 6 is a powder X-ray diffraction spectrum of an oxycarbonitride (6) in Example 6.

A powder X-ray diffraction spectrum of the catalyst (6) is shown in FIG. 6.

2. Production of Fuel Cell Electrode

A fuel cell electrode (6) was manufactured in the same manner as in Example 1, except that the catalyst (6) was used.

3. Evaluation of Oxygen Reducing Ability

The catalytic performance (oxygen reducing ability) was evaluated in the same manner as in Example 1, except that the fuel cell electrode (6) was used.

Figure 20:
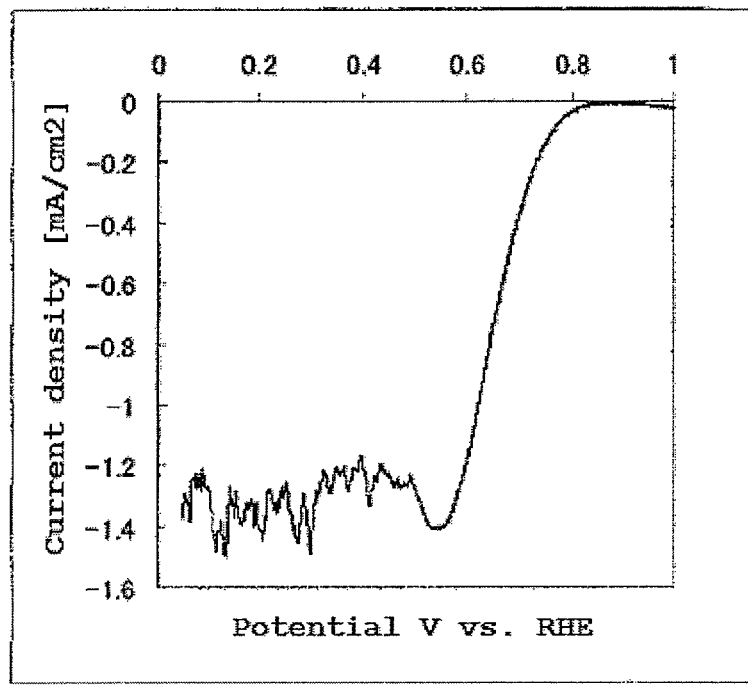
FIG. 20 is a graph showing an evaluation of the oxygen reducing ability of a fuel cell electrode (6) in Example 6.

The current-potential curve recorded during the measurement is shown in FIG. 20.

The fuel cell electrode (6) manufactured in Example 6 had an oxygen reduction onset potential of 0.88 V (vs. NHE) and was found to have high oxygen reducing ability.

Example 7

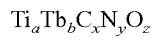
Ti$_a$Tb$_b$C$_x$N$_y$O$_z$

1. Preparation of Catalyst

Carbon (Vulcan 72 manufactured by Cabot Corporation) weighing 1.32 g was crushed sufficiently and mixed with 3.52 g of titanium oxide (Super-Titania F6 manufactured by Showa Denko K.K.) and 0.164 g of terbium oxide (Tb$_2$O$_3$, manufactured by Shin-Etsu Chemical Co., Ltd.). The resultant powder mixture was heat treated in a tubular furnace in a nitrogen atmosphere at 1700° C. for 3 hours to give 2.60 g of a carbonitride (7) containing titanium and terbium (approximately 2 mol % with respect to 100 mol % of titanium). The carbonitride was crushed in a mortar.

The carbonitride (7) weighing 1.00 g was heat treated in the same manner as in Example 1 to give 1.24 g of an oxycarbonitride containing terbium and titanium (hereinafter, also referred to as "catalyst (7)"). The results of the elemental analysis of the catalyst (7) are described in Table 1.

Figure 7:
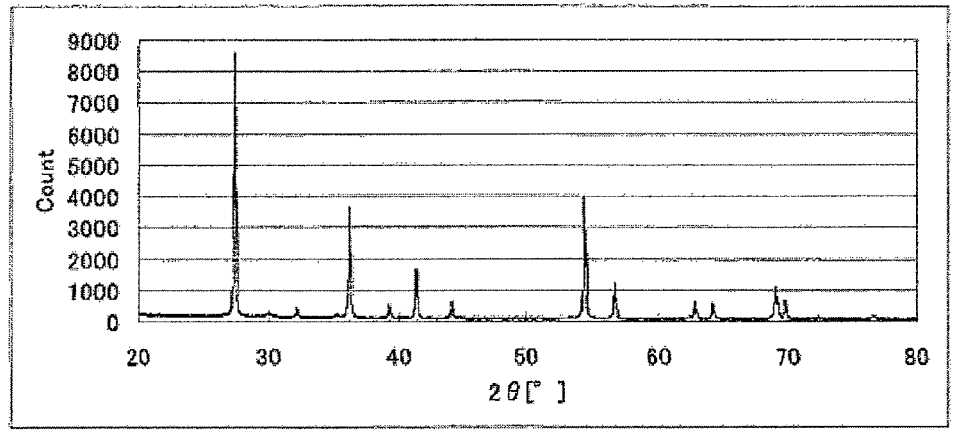
FIG. 7 is a powder X-ray diffraction spectrum of an oxycarbonitride (7) in Example 7.

A powder X-ray diffraction spectrum of the catalyst (7) is shown in FIG. 7.

2. Production of Fuel Cell Electrode

A fuel cell electrode (7) was manufactured in the same manner as in Example 1, except that the catalyst (7) was used.

3. Evaluation of Oxygen Reducing Ability

The catalytic performance (oxygen reducing ability) was evaluated in the same manner as in Example 1, except that the fuel cell electrode (7) was used.

Figure 21:
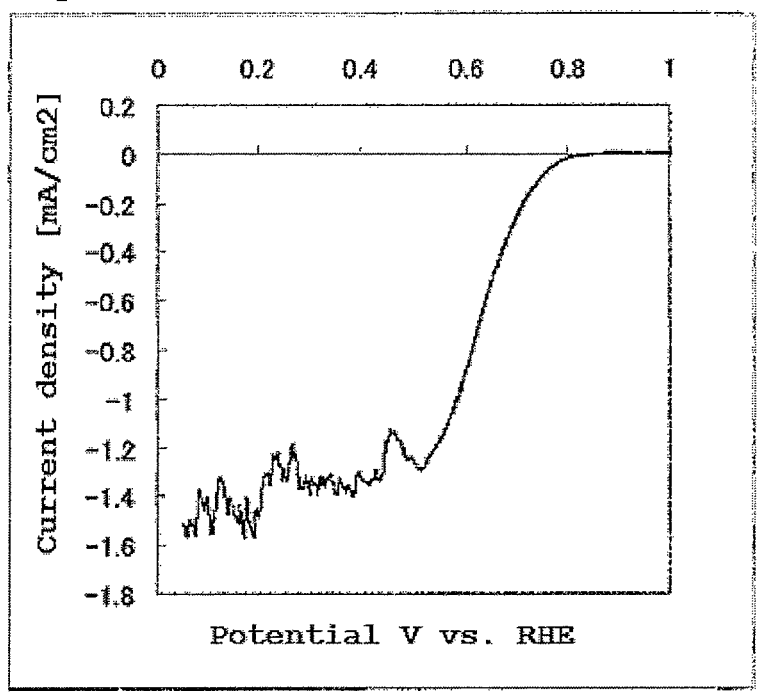
FIG. 21 is a graph showing an evaluation of the oxygen reducing ability of a fuel cell electrode (7) in Example 7.

The current-potential curve recorded during the measurement is shown in FIG. 21.

The fuel cell electrode (7) manufactured in Example 7 had an oxygen reduction onset potential of 0.86 V (vs. NHE) and was found to have high oxygen reducing ability.

Example 8

Ti$_a$Dy$_b$C$_x$N$_y$O$_z$

1. Preparation of Catalyst

Carbon (Vulcan 72 manufactured by Cabot Corporation) weighing 1.32 g was crushed sufficiently and mixed with 3.52 g of titanium oxide (Super-Titania F6 manufactured by Showa Denko K.K.) and 0.164 g of dysprosium oxide ($Dy_2O_3$, manufactured by Shin-Etsu Chemical Co., Ltd.). The resultant powder mixture was heat treated in a tubular furnace in a nitrogen atmosphere at 1700° C. for 3 hours to give 2.61 g of a carbonitride (8) containing titanium and dysprosium (approximately 2 mol % with respect to 100 mol % of titanium). The carbonitride was crushed in a mortar.

The carbonitride (8) weighing 1.00 g was heat treated in the same manner as in Example 1 to give 1.27 g of an oxycarbonitride containing titanium and dysprosium (hereinafter, also referred to as "catalyst (8)"). The results of the elemental analysis of the catalyst (8) are described in Table 1.

Figure 8:
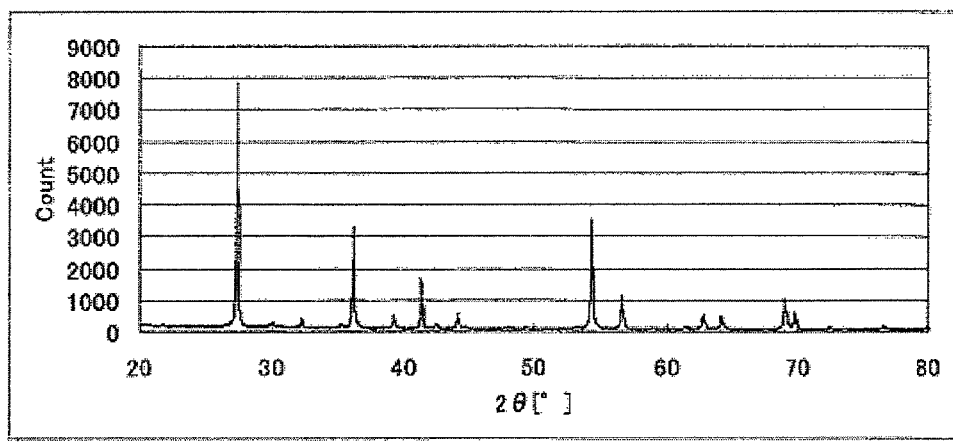
FIG. 8 is a powder X-ray diffraction spectrum of an oxycarbonitride (8) in Example 8.

A powder X-ray diffraction spectrum of the catalyst (8) is shown in FIG. 8.

2. Production of Fuel Cell Electrode

A fuel cell electrode (8) was manufactured in the same manner as in Example 1, except that the catalyst (8) was used.

3. Evaluation of Oxygen Reducing Ability

The catalytic performance (oxygen reducing ability) was evaluated in the same manner as in Example 1, except that the fuel cell electrode (8) was used.

Figure 22:
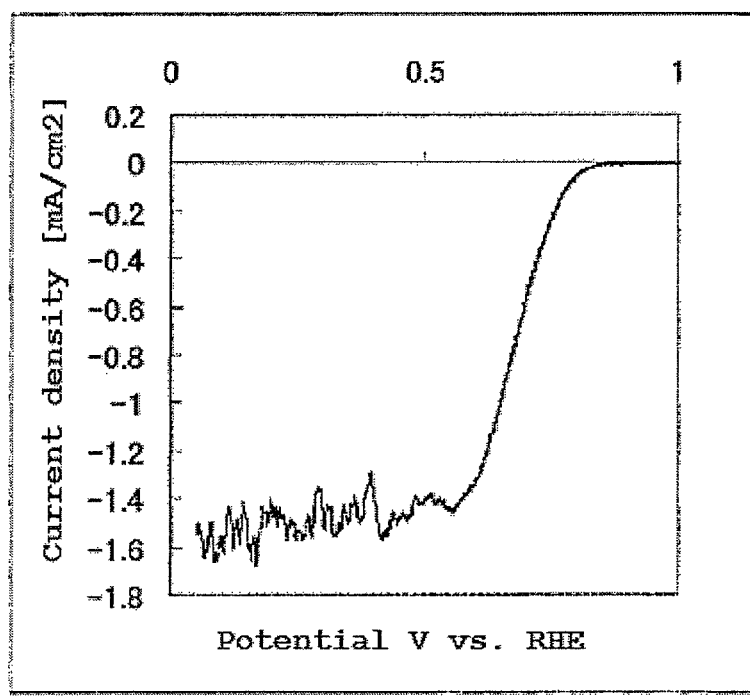
FIG. 22 is a graph showing an evaluation of the oxygen reducing ability of a fuel cell electrode (8) in Example 8.

The current-potential curve recorded during the measurement is shown in FIG. 22.

The fuel cell electrode (8) manufactured in Example 8 had an oxygen reduction onset potential of 0.87 V (vs. NHE) and was found to have high oxygen reducing ability.

Example 9

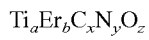
$Ti_aEr_bC_xN_yO_z$

1. Preparation of Catalyst

Carbon (Vulcan 72 manufactured by Cabot Corporation) weighing 1.34 g was crushed sufficiently and mixed with 3.57 g of titanium oxide (Super-Titania F6 manufactured by Showa Denko K.K.) and 0.077 g of erbium oxide ($Er_2O_3$, manufactured by Shin-Etsu Chemical Co., Ltd.). The resultant powder mixture was heat treated in a tubular furnace in a nitrogen atmosphere at 1700° C. for 3 hours to give 2.65 g of a carbonitride (9) containing titanium and erbium (approximately 2 mol % with respect to 100 mol % of titanium). The carbonitride was crushed in a mortar.

The carbonitride (9) weighing 1.00 g was heat treated in the same manner as in Example 1 to give 1.25 g of an oxycarbonitride containing titanium and erbium (hereinafter, also referred to as "catalyst (9)"). The results of the elemental analysis of the catalyst (9) are described in Table 1.

Figure 9:
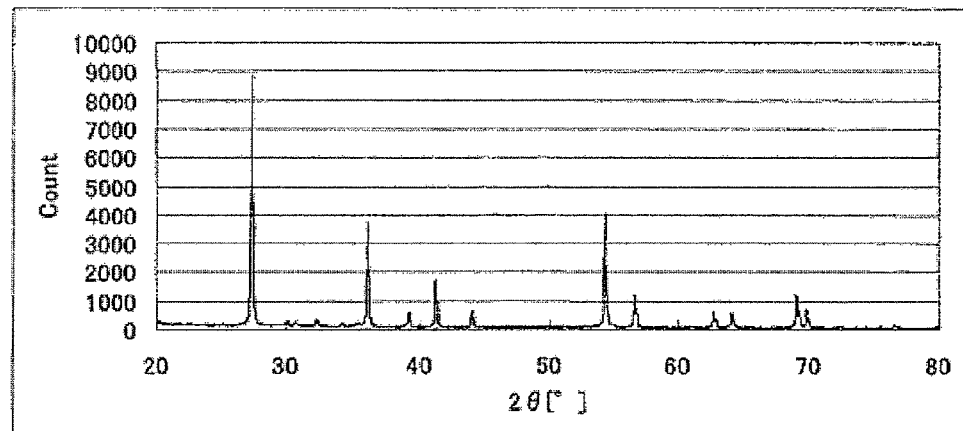
FIG. 9 is a powder X-ray diffraction spectrum of an oxycarbonitride (9) in Example 9.

A powder X-ray diffraction spectrum of the catalyst (9) is shown in FIG. 9.

2. Production of Fuel Cell Electrode

A fuel cell electrode (9) was manufactured in the same manner as in Example 1, except that the catalyst (9) was used.

3. Evaluation Of Oxygen Reducing Ability

The catalytic performance (oxygen reducing ability) was evaluated in the same manner as in Example 1, except that the fuel cell electrode (9) was used.

Figure 23:
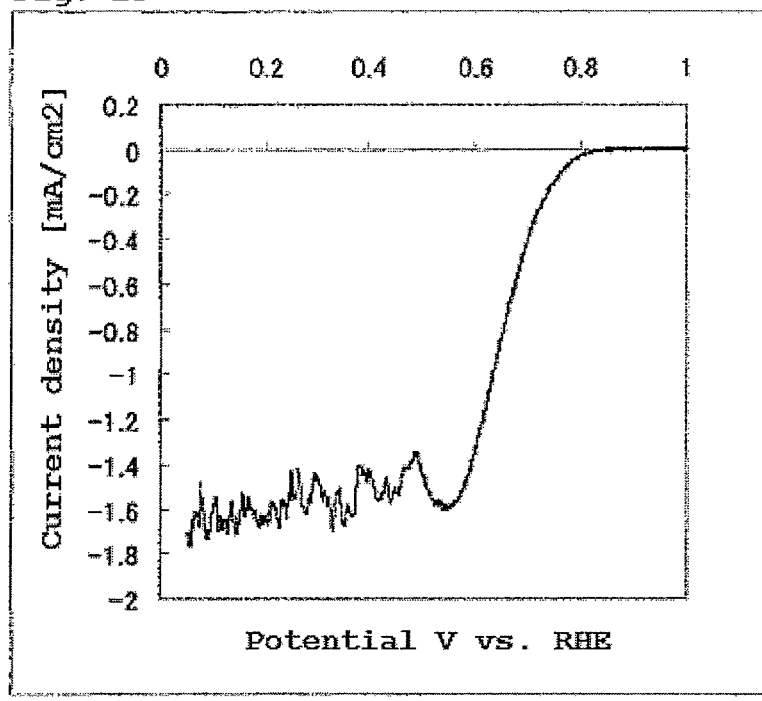
FIG. 23 is a graph showing an evaluation of the oxygen reducing ability of a fuel cell electrode (9) in Example 9.

The current-potential curve recorded during the measurement is shown in FIG. 23.

The fuel cell electrode (9) manufactured in Example 9 had an oxygen reduction onset potential of 0.87 V (vs. NHE) and was found to have high oxygen reducing ability.

Example 10

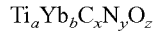
$Ti_aYb_bC_xN_yO_z$

1. Preparation of Catalyst

Carbon (Vulcan 72 manufactured by Cabot Corporation) weighing 1.32 g was crushed sufficiently and mixed with 3.51 g of titanium oxide (Super-Titania F6 manufactured by Showa Denko K.K.) and 0.173 g of ytterbium oxide ($Yb_2O_3$, manufactured by Shin-Etsu Chemical Co., Ltd.). The resultant powder mixture was heat treated in a tubular furnace in a nitrogen atmosphere at 1700° C. for 3 hours to give 2.70 g of a carbonitride (10) containing titanium and ytterbium (approximately 2 mol % with respect to 100 mol % of titanium). The carbonitride was crushed in a mortar.

The carbonitride (10) weighing 1.00 g was heat treated in the same manner as in Example 1 to give 1.26 g of an oxycarbonitride containing titanium and ytterbium (hereinafter, also referred to as "catalyst (10)"). The results of the elemental analysis of the catalyst (10) are described in Table 1.

Figure 10:
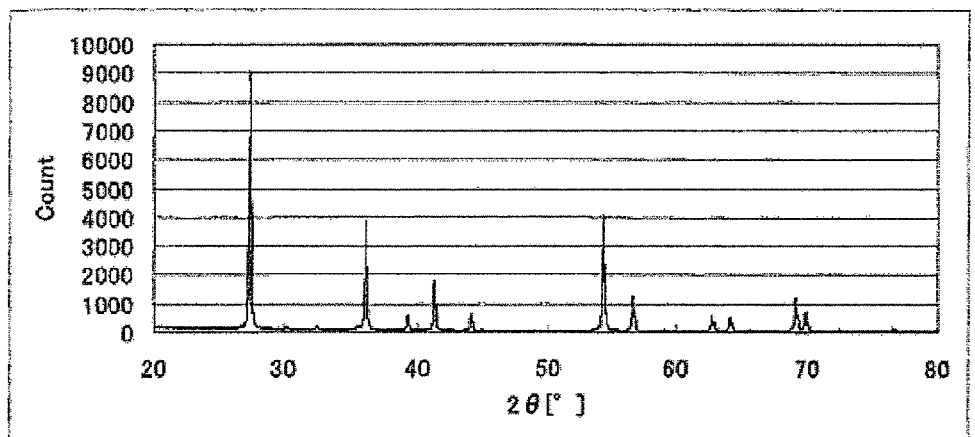
FIG. 10 is a powder X-ray diffraction spectrum of an oxycarbonitride (10) in Example 10.

A powder X-ray diffraction spectrum of the catalyst (10) is shown in FIG. 10.

2. Production of Fuel Cell Electrode

A fuel cell electrode (10) was manufactured in the same manner as in Example 1, except that the catalyst (10) was used.

3. Evaluation of Oxygen Reducing Ability

The catalytic performance (oxygen reducing ability) was evaluated in the same manner as in Example 1, except that the fuel cell electrode (10) was used.

Figure 24:
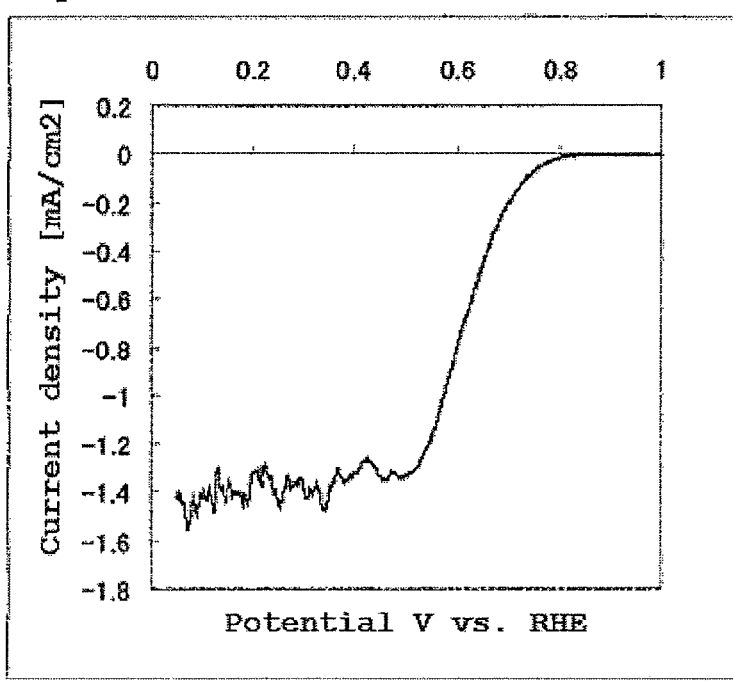
FIG. 24 is a graph showing an evaluation of the oxygen reducing ability of a fuel cell electrode (10) in Example 10.

The current-potential curve recorded during the measurement is shown in FIG. 24.

The fuel cell electrode (10) manufactured in Example 10 had an oxygen reduction onset potential of 0.86 V (vs. NHE) and was found to have high oxygen reducing ability.

Example 11

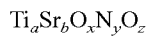
$Ti_aSr_bO_xN_yO_z$

1. Preparation of Catalyst

Carbon (Vulcan 72 manufactured by Cabot Corporation) weighing 1.33 g was crushed sufficiently and mixed with 3.54 g of titanium oxide (Super-Titania F6 manufactured by Showa Denko K.K.) and 0.131 g of strontium carbonate (SW-K manufactured by SAKAI CHEMICAL INDUSTRY CO., LTD.). The resultant powder mixture was heat treated in a tubular furnace in a nitrogen atmosphere at 1700° C. for 3 hours to give 2.46 g of a carbonitride (11) containing titanium and strontium (approximately 2 mol % with respect to 100 mol % of titanium). The carbonitride was crushed in a mortar.

The carbonitride (11) weighing 1.00 g was heat treated in the same manner as in Example 1 to give 1.22 g of an oxycarbonitride containing strontium and titanium (hereinafter, also referred to as "catalyst (11)"). The results of the elemental analysis of the catalyst (11) are described in Table 1.

Figure 11:
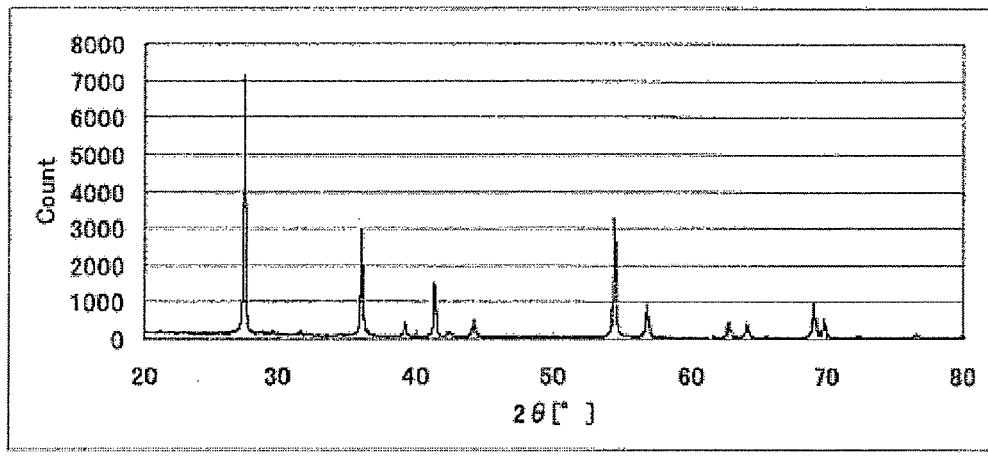
FIG. 11 is a powder X-ray diffraction spectrum of an oxycarbonitride (11) in Example 11.

A powder X-ray diffraction spectrum of the catalyst (11) is shown in FIG. 11.

2. Production of Fuel Cell Electrode

A fuel cell electrode (11) was manufactured in the same manner as in Example 1, except that the catalyst (11) was used.

3. Evaluation of Oxygen Reducing Ability

The catalytic performance (oxygen reducing ability) was evaluated in the same manner as in Example 1, except that the fuel cell electrode (11) was used.

Figure 25:
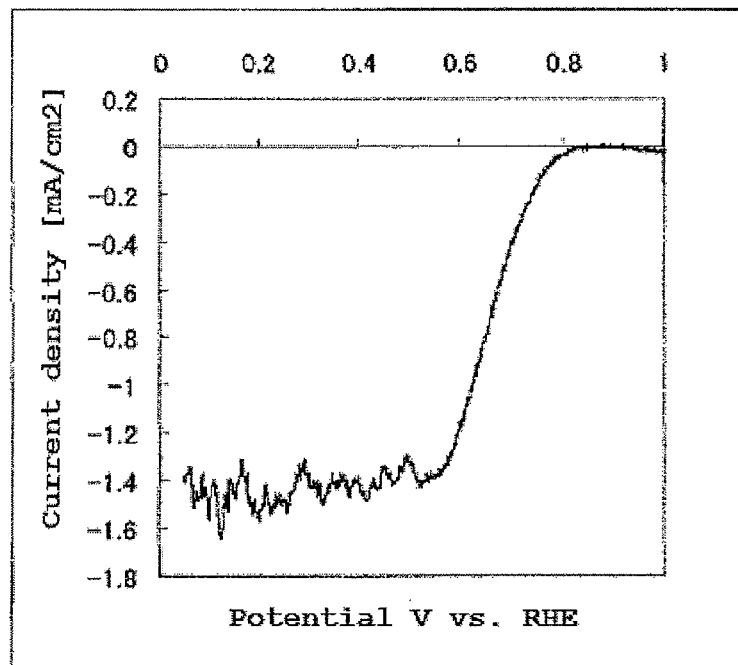
FIG. 25 is a graph showing an evaluation of the oxygen reducing ability of a fuel cell electrode (11) in Example 11.

The current-potential curve recorded during the measurement is shown in FIG. 25.

The fuel cell electrode (11) manufactured in Example 11 had an oxygen reduction onset potential of 0.87 V (vs. NHE) and was found to have high oxygen reducing ability.

Example 12

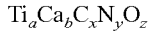
$Ti_aCa_bC_xN_yO_z$

1. Preparation of Catalyst

Carbon (Vulcan 72 manufactured by Cabot Corporation) weighing 1.35 g was crushed sufficiently and mixed with 3.60 g of titanium oxide (Super-Titania F6 manufactured by Showa Denko K.K.) and 0.045 g of calcium carbonate (CS-4N-A manufactured by Ube Material Industries, Ltd.). The resultant powder mixture was heat treated in a tubular furnace in a nitrogen atmosphere at 1700° C. for 3 hours to give 2.47 g of a carbonitride (12) containing titanium and calcium (approximately 1 mol % with respect to 100 mol % of titanium). The carbonitride was crushed in a mortar.

The carbonitride (12) weighing 1.00 g was heat treated in the same manner as in Example 1 to give 1.24 g of an oxycarbonitride containing titanium and calcium (hereinafter, also referred to as "catalyst (12)"). The results of the elemental analysis of the catalyst (12) are described in Table 1.

Figure 12:
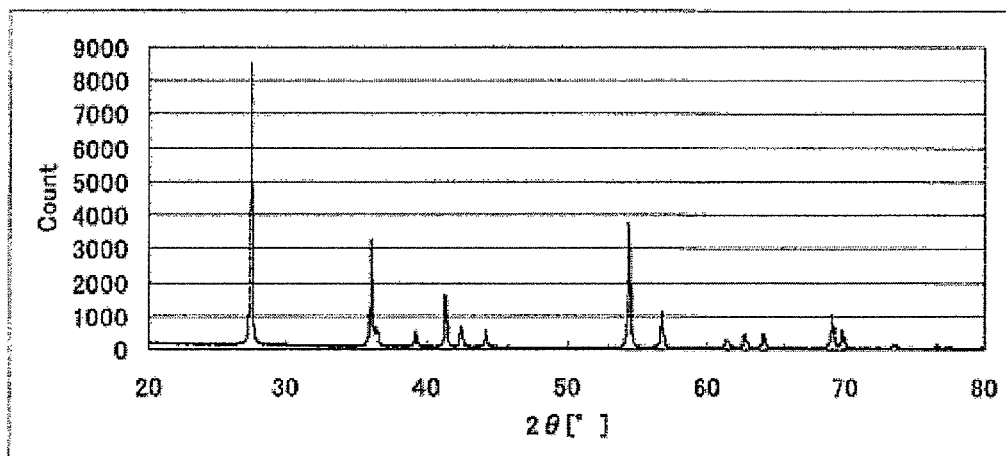
FIG. 12 is a powder X-ray diffraction spectrum of an oxycarbonitride (12) in Example 12.

A powder X-ray diffraction spectrum of the catalyst (12) is shown in FIG. 12.

2. Production of Fuel Cell Electrode

A fuel cell electrode (12) was manufactured in the same manner as in Example 1, except that the catalyst (12) was used.

3. Evaluation of Oxygen Reducing Ability

The catalytic performance (oxygen reducing ability) was evaluated in the same manner as in Example 1, except that the fuel cell electrode (12) was used.

Figure 26:
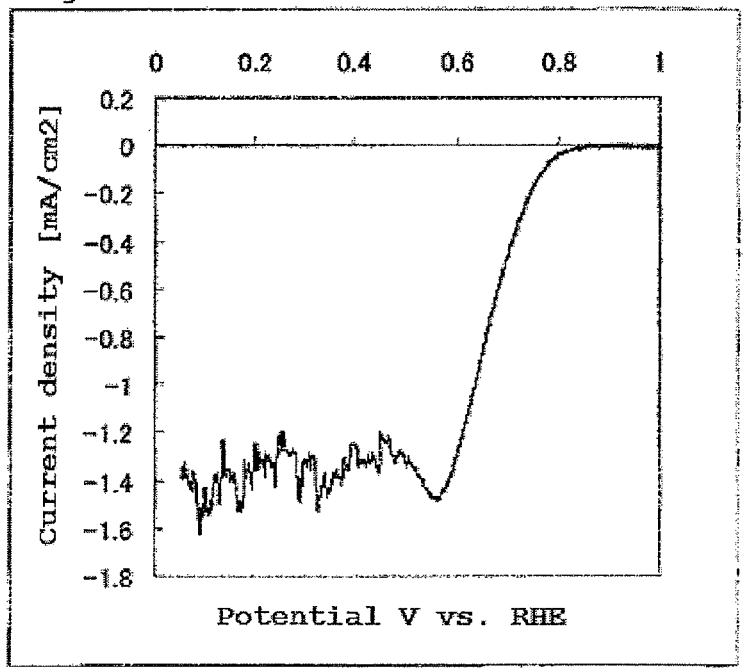
FIG. 26 is a graph showing an evaluation of the oxygen reducing ability of a fuel cell electrode (12) in Example 12.

The current-potential curve recorded during the measurement is shown in FIG. 26.

The fuel cell electrode (12) manufactured in Example 12 had an oxygen reduction onset potential of 0.88 V (vs. NHE) and was found to have high oxygen reducing ability.

Example 13

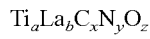
$Ti_aLa_bC_xN_yO_z$

1. Preparation of Catalyst

Carbon (Vulcan 72 manufactured by Cabot Corporation) weighing 1.34 g was crushed sufficiently and mixed with 3.57 g of titanium oxide (Super-Titania F6 manufactured by Showa Denko K.K.) and 0.036 g of lanthanum oxide ($La_2O_3$, manufactured by Shin-Etsu Chemical Co., Ltd.). The resultant powder mixture was heat treated in a tubular furnace in a nitrogen atmosphere at 1700° C. for 3 hours to give 2.49 g of a carbonitride (13) containing titanium and lanthanum (approximately 0.5 mol % with respect to 100 mol % of titanium). The carbonitride was crushed in a mortar.

The carbonitride (13) weighing 1.00 g was heat treated in the same manner as in Example 1 to give 1.24 g of an oxycarbonitride containing titanium and lanthanum (hereinafter, also referred to as "catalyst (13)"). The results of the elemental analysis of the catalyst (13) are described in Table 1.

Figure 29:
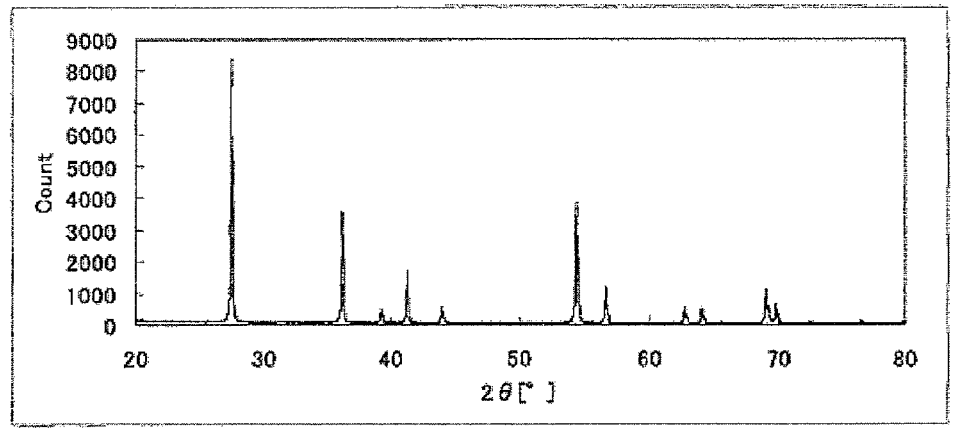
FIG. 29 is a powder X-ray diffraction spectrum of an oxycarbonitride (13) in Example 13.

A powder X-ray diffraction spectrum of the catalyst (13) is shown in FIG. 29.

2. Production of Fuel Cell Electrode

A fuel cell electrode (13) was manufactured in the same manner as in Example 1, except that the catalyst (13) was used.

3. Evaluation of Oxygen Reducing Ability

The catalytic performance (oxygen reducing ability) was evaluated in the same manner as in Example 1, except that the fuel cell electrode (13) was used.

Figure 33:
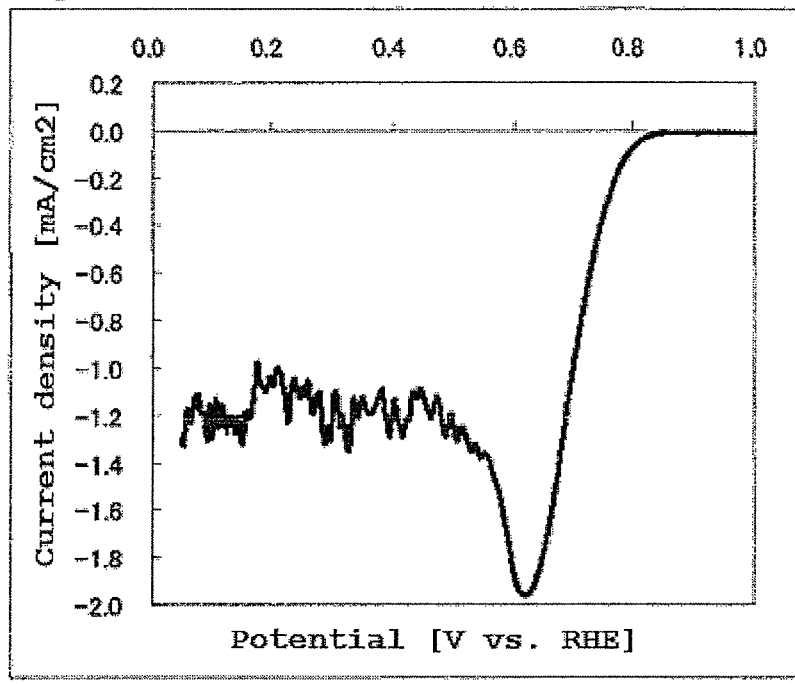
FIG. 33 is a graph showing an evaluation of the oxygen reducing ability of a fuel cell electrode (13) in Example 13.

The current-potential curve recorded during the measurement is shown in FIG. 33.

The fuel cell electrode (13) manufactured in Example 13 had an oxygen reduction onset potential of 0.89 V (vs. NHE) and was found to have high oxygen reducing ability.

Example 14

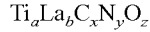
$Ti_aLa_bC_xN_yO_z$

1. Preparation of Catalyst

Carbon (Vulcan 72 manufactured by Cabot Corporation) weighing 1.34 g was crushed sufficiently and mixed with 3.57 g of titanium oxide (Super-Titania F6 manufactured by Showa Denko K.K.) and 0.72 g of lanthanum oxide ($La_2O_3$, manufactured by Shin-Etsu Chemical Co., Ltd.). The resultant powder mixture was heat treated in a tubular furnace in a nitrogen atmosphere at 1700° C. for 3 hours to give 2.48 g of a carbonitride (14) containing titanium and lanthanum (approximately 10 mol % with respect to 100 mol % of titanium). The carbonitride was crushed in a mortar.

The carbonitride (14) weighing 1.00 g was heat treated in the same manner as in Example 1 to give 1.22 g of an oxycarbonitride containing titanium and lanthanum (hereinafter, also referred to as "catalyst (14)"). The results of the elemental analysis of the catalyst (14) are described in Table 1.

Figure 30:
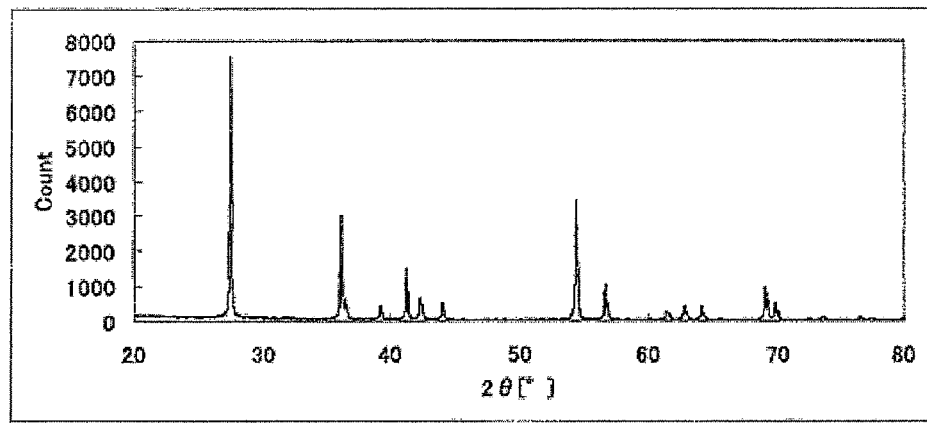
FIG. 30 is a powder X-ray diffraction spectrum of an oxycarbonitride (14) in Example 14.

A powder X-ray diffraction spectrum of the catalyst (14) is shown in FIG. 30.

2. Production of Fuel Cell Electrode

A fuel cell electrode (14) was manufactured in the same manner as in Example 1, except that the catalyst (14) was used.

3. Evaluation of Oxygen Reducing Ability

The catalytic performance (oxygen reducing ability) was evaluated in the same manner as in Example 1, except that the fuel cell electrode (14) was used.

Figure 34:
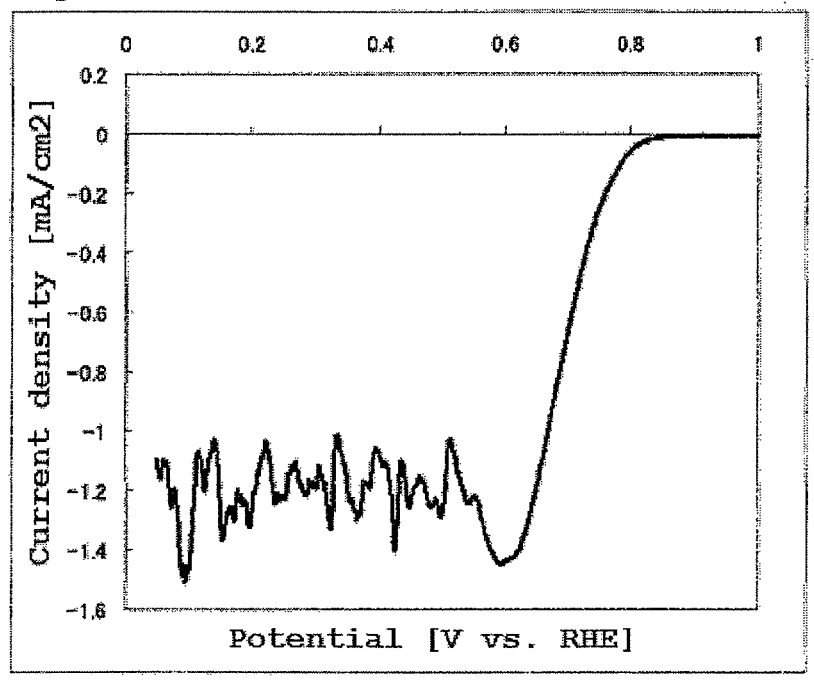
FIG. 34 is a graph showing an evaluation of the oxygen reducing ability of a fuel cell electrode (14) in Example 14.

The current-potential curve recorded during the measurement is shown in FIG. 34.

The fuel cell electrode (14) manufactured in Example 14 had an oxygen reduction onset potential of 0.88 V (vs. NHE) and was found to have high oxygen reducing ability.

Example 15

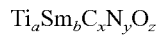
$Ti_aSm_bC_xN_yO_z$

1. Preparation of Catalyst

Carbon (Vulcan 72 manufactured by Cabot Corporation) weighing 1.34 g was crushed sufficiently and mixed with 3.57 g of titanium oxide (Super-Titania F6 manufactured by Showa Denko K.K.) and 0.038 g of samarium oxide ($Sm_2O_3$, manufactured by Shin-Etsu Chemical Co., Ltd.). The resultant powder mixture was heat treated in a tubular furnace in a nitrogen atmosphere at 1700° C. for 3 hours to give 2.51 g of a carbonitride (15) containing titanium and samarium (approximately 0.5 mol % with respect to 100 mol % of titanium). The carbonitride was crushed in a mortar.

The carbonitride (15) weighing 1.00 g was heat treated in the same manner as in Example 1 to give 1.24 g of an oxycarbonitride containing titanium and samarium (hereinafter, also referred to as "catalyst (15)"). The results of the elemental analysis of the catalyst (15) are described in Table 1.

Figure 31:
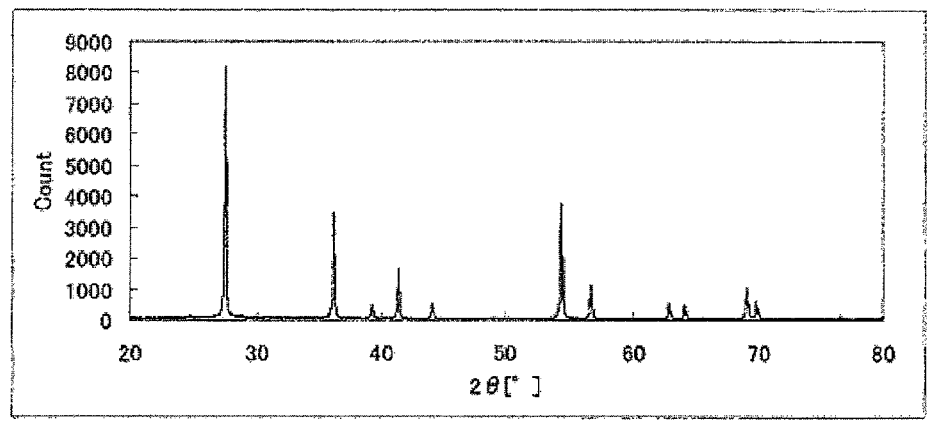
FIG. 31 is a powder X-ray diffraction spectrum of an oxycarbonitride (15) in Example 15.

A powder X-ray diffraction spectrum of the catalyst (15) is shown in FIG. 31.

2. Production of Fuel Cell Electrode

A fuel cell electrode (15) was manufactured in the same manner as in Example 1, except that the catalyst (15) was used.

3. Evaluation of Oxygen Reducing Ability

The catalytic performance (oxygen reducing ability) was evaluated in the same manner as in Example 1, except that the fuel cell electrode (15) was used.

Figure 35:
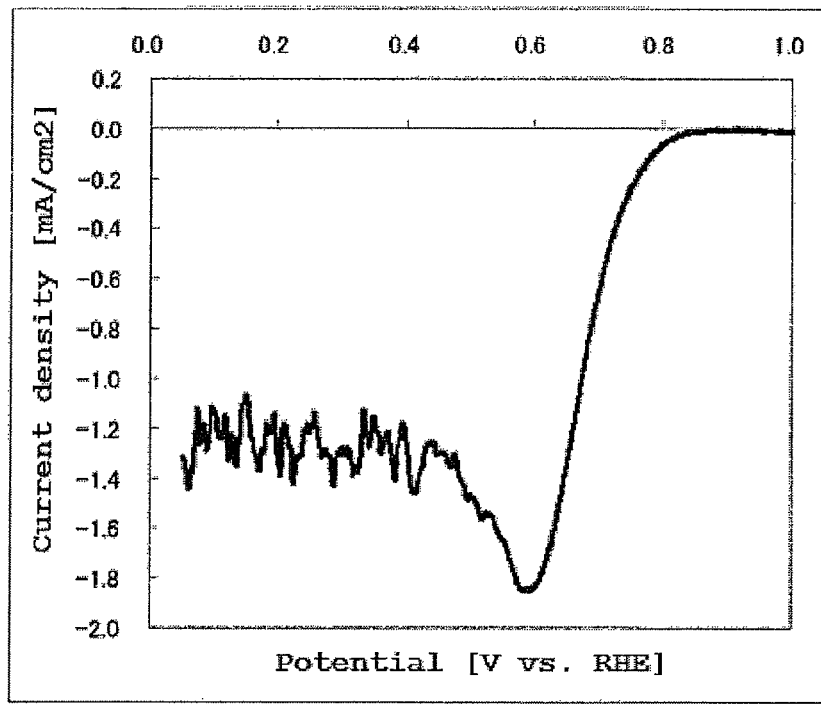
FIG. 35 is a graph showing an evaluation of the oxygen reducing ability of a fuel cell electrode (15) in Example 15.

The current-potential curve recorded during the measurement is shown in FIG. 35.

The fuel cell electrode (15) manufactured in Example 15 had an oxygen reduction onset potential of 0.88 V (vs. NHE) and was found to have high oxygen reducing ability.

Example 16

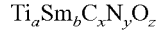
$Ti_aSm_bC_xN_yO_z$

1. Preparation of Catalyst

Carbon (Vulcan 72 manufactured by Cabot Corporation) weighing 1.34 g was crushed sufficiently and mixed with 3.57 g of titanium oxide (Super-Titania F6 manufactured by Showa Denko K.K.) and 0.154 g of samarium oxide ($Sm_2O_3$, manufactured by Shin-Etsu Chemical Co., Ltd.). The resultant powder mixture was heat treated in a tubular furnace in a nitrogen atmosphere at 1700° C. for 3 hours to give 2.48 g of a carbonitride (16) containing titanium and samarium (approximately 10 mol % with respect to 100 mol % of titanium). The carbonitride was crushed in a mortar.

The carbonitride (16) weighing 1.00 g was heat treated in the same manner as in Example 1 to give 1.23 g of an oxycarbonitride containing titanium and samarium (hereinafter, also referred to as "catalyst (16)"). The results of the elemental analysis of the catalyst (16) are described in Table 1.

Figure 32:
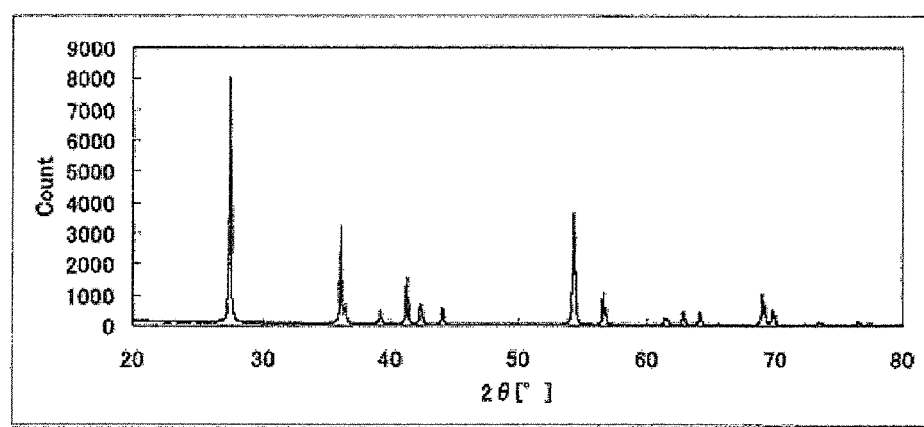
FIG. 32 is a powder X-ray diffraction spectrum of an oxycarbonitride (16) in Example 16.

A powder X-ray diffraction spectrum of the catalyst (16) is shown in FIG. 32.

2. Production of Fuel Cell Electrode

A fuel cell electrode (16) was manufactured in the same manner as in Example 1, except that the catalyst (16) was used.

3. Evaluation of Oxygen Reducing Ability

The catalytic performance (oxygen reducing ability) was evaluated in the same manner as in Example 1, except that the fuel cell electrode (16) was used.

Figure 36:
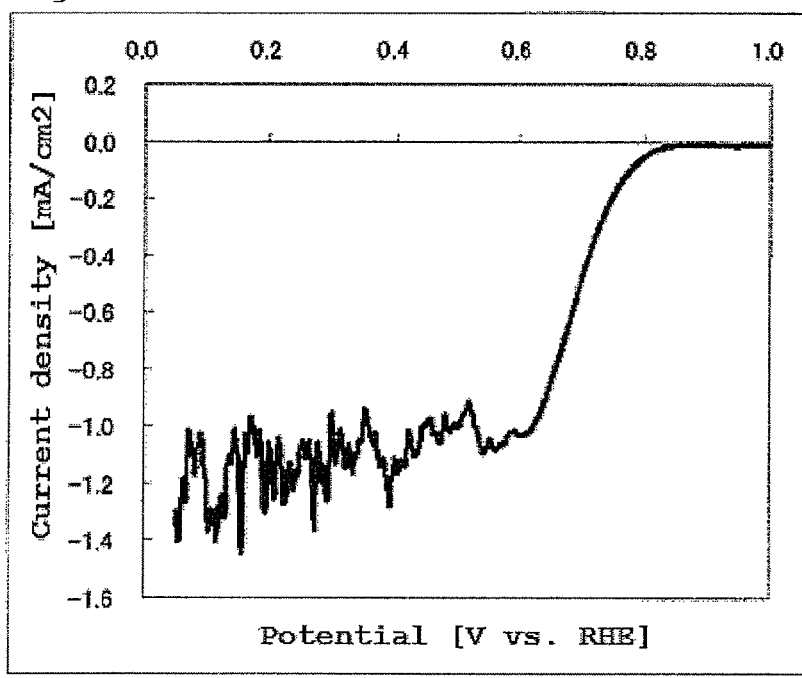
FIG. 36 is a graph showing an evaluation of the oxygen reducing ability of a fuel cell electrode (16) in Example 16.

The current-potential curve recorded during the measurement is shown in FIG. 36.

The fuel cell electrode (16) manufactured in Example 16 had an oxygen reduction onset potential of 0.86 V (vs. NHE) and was found to have high oxygen reducing ability.

Reference Example 1

$Ti_aC_xN_yO_z$

1. Preparation of Catalyst

Titanium oxide (Super-Titania F6 manufactured by Showa Denko K.K.) weighing 3.63 g and carbon (Vulcan 72 manufactured by Cabot Corporation) weighing 1.37 g were crushed sufficiently and mixed together. The resultant powder mixture was heat treated in a tubular furnace in a nitrogen atmosphere at 1700° C. for 3 hours to give 2.51 g of titanium carbonitride (13'). The carbonitride was crushed in a mortar.

The carbonitride (13') weighing 1.00 g was heat treated in the same manner as in Example 1 to give 1.24 g of an oxycarbonitride containing titanium (hereinafter, also referred to as "catalyst (13')"). The results of the elemental analysis of the catalyst (13') are described in Table 1.

Figure 13:
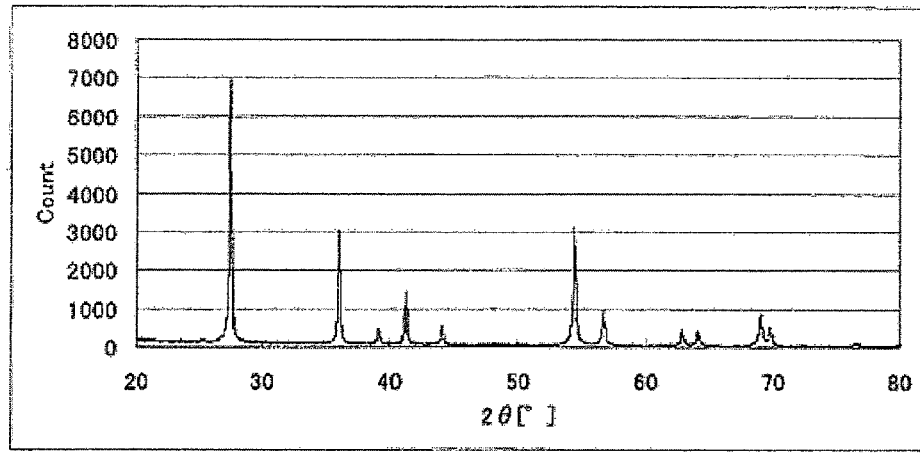
FIG. 13 is a powder X-ray diffraction spectrum of an oxycarbonitride (13') in Reference Example 1.

A powder X-ray diffraction spectrum of the catalyst (13') is shown in FIG. 13.

2. Production of Fuel Cell Electrode

A fuel cell electrode (13') was manufactured in the same manner as in Example 1, except that the catalyst (13') was used.

3. Evaluation of Oxygen Reducing Ability

The catalytic performance (oxygen reducing ability) was evaluated in the same manner as in Example 1, except that the fuel cell electrode (13') was used.

Figure 27:
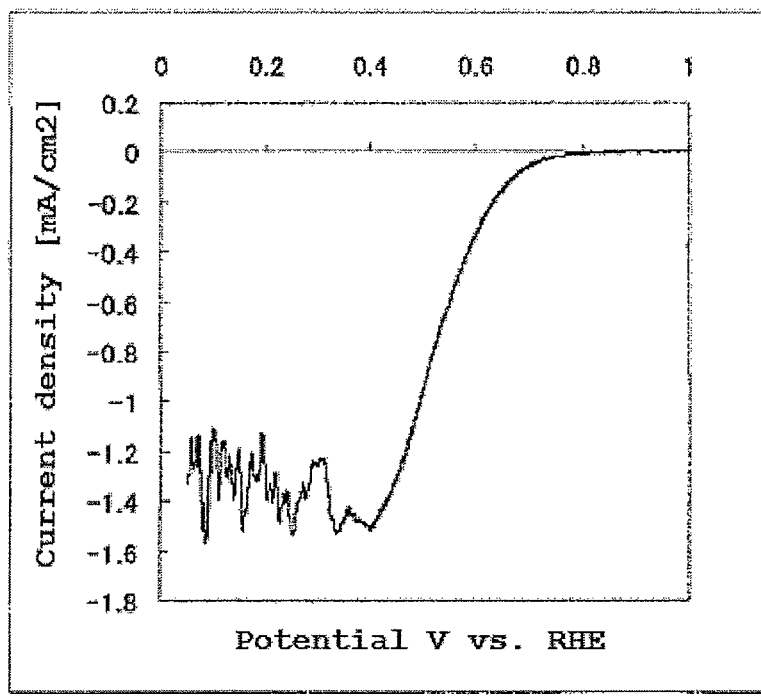
FIG. 27 is a graph showing an evaluation of the oxygen reducing ability of a fuel cell electrode (13') in Reference Example 1.

The current-potential curve recorded during the measurement is shown in FIG. 27.

The fuel cell electrode (13') manufactured in Reference Example 1 had an oxygen reduction onset potential of 0.80 V (vs. NHE) and was found to have oxygen reducing ability.

Comparative Example 1

$TiC_xN_y$

1. Preparation of Catalyst

Figure 14:
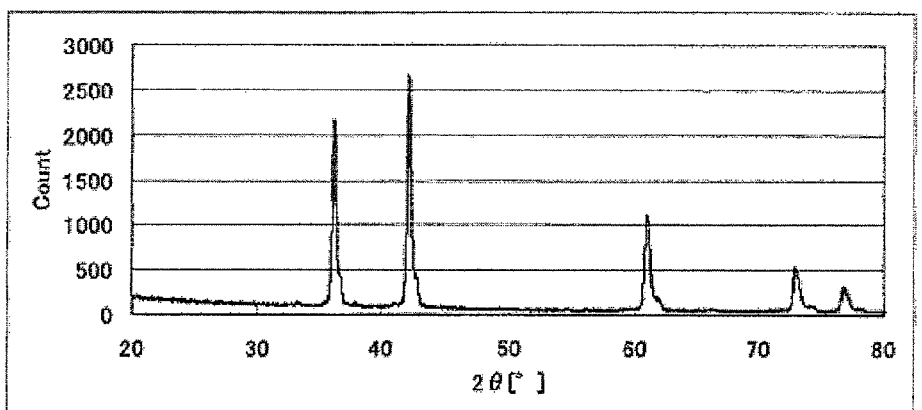
FIG. 14 is a powder X-ray diffraction spectrum of a carbonitride in Comparative Example 1.

Titanium carbonitride (purchased from Wako Pure Chemical Industries, Ltd., 40 nm) was used directly as a catalyst. A powder X-ray diffraction spectrum is shown in FIG. 14.

2. Production of Fuel Cell Electrode

A fuel cell electrode (14') was manufactured in the same manner as in Example 1, except that the above carbonitride was used as the catalyst.

3. Evaluation of Oxygen Reducing Ability

The catalytic performance (oxygen reducing ability) was evaluated in the same manner as in Example 1, except that the fuel cell electrode (14') was used.

Figure 28:
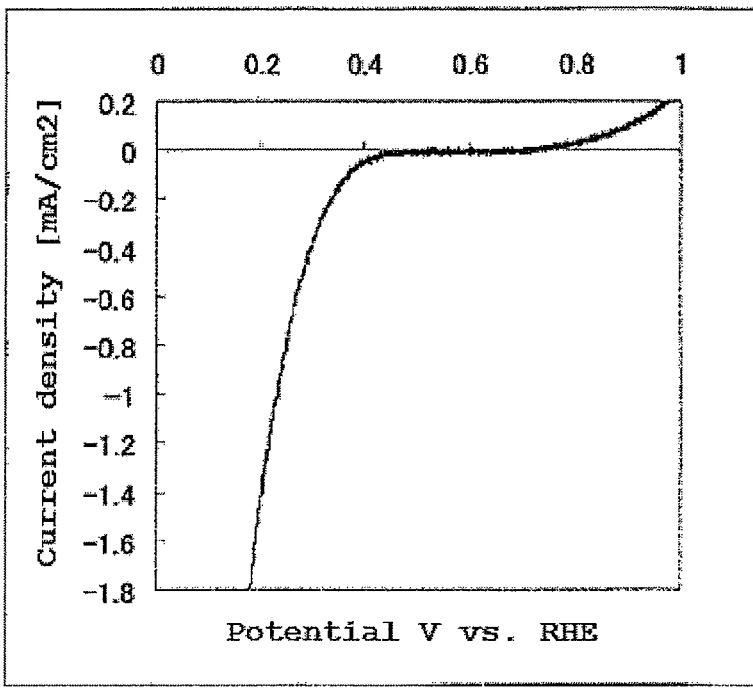
FIG. 28 is a graph showing an evaluation of the oxygen reducing ability of a fuel cell electrode (14') in Comparative Example 1.

The current-potential curve recorded during the measurement is shown in FIG. 28.

The fuel cell electrode (14') manufactured in Comparative Example 1 had an oxygen reduction onset potential of 0.51 V (vs. NHE) and was found to have low oxygen reducing ability.

TABLE 1

|  | Metal M | a (a/(a + b)) | b (b/(a + b)) | x (x/(a + b)) | y (y/(a + b)) | z (z/(a + b)) |
|---|---|---|---|---|---|---|
| Ex. 1 | La | 1 (0.98) | 0.02 (0.02) | 0.14 (0.14) | 0.09 (0.09) | 1.72 (1.69) |
| Ex. 2 | Sm | 1 (0.99) | 0.01 (0.01) | 0.12 (0.12) | 0.10 (0.10) | 1.59 (1.57) |
| Ex. 3 | Pr | 1 (0.98) | 0.02 (0.02) | 0.14 (0.14) | 0.11 (0.11) | 1.58 (1.55) |
| Ex. 4 | Nd | 1 (0.98) | 0.02 (0.02) | 0.13 (0.13) | 0.10 (0.10) | 1.42 (1.39) |
| Ex. 5 | Eu | 1 (0.98) | 0.02 (0.02) | 0.14 (0.14) | 0.09 (0.09) | 1.56 (1.53) |
| Ex. 6 | Gd | 1 (0.98) | 0.02 (0.02) | 0.13 (0.13) | 0.11 (0.11) | 1.66 (1.63) |
| Ex. 7 | Tb | 1 (0.98) | 0.02 (0.02) | 0.12 (0.12) | 0.09 (0.09) | 1.58 (1.55) |
| Ex. 8 | Dy | 1 (0.98) | 0.02 (0.02) | 0.15 (0.15) | 0.11 (0.11) | 1.70 (1.67) |
| Ex. 9 | Er | 1 (0.98) | 0.02 (0.02) | 0.13 (0.13) | 0.10 (0.10) | 1.60 (1.57) |
| Ex. 10 | Yb | 1 (0.98) | 0.02 (0.02) | 0.14 (0.14) | 0.11 (0.11) | 1.61 (1.58) |
| Ex. 11 | Sr | 1 (0.98) | 0.02 (0.02) | 0.15 (0.15) | 0.12 (0.12) | 1.48 (1.45) |
| Ex. 12 | Ca | 1 (0.99) | 0.01 (0.01) | 0.13 (0.13) | 0.11 (0.11) | 1.59 (1.57) |
| Ex. 13 | La | 1 (1.00) | 0.005 (0.00) | 0.15 (0.15) | 0.09 (0.09) | 1.75 (1.74) |
| Ex. 14 | La | 1 (0.91) | 0.10 (0.09) | 0.14 (0.13) | 0.08 (0.07) | 1.74 (1.58) |
| Ex. 15 | Sm | 1 (1.00) | 0.005 (0.00) | 0.16 (0.16) | 0.10 (0.10) | 1.78 (1.77) |
| Ex. 16 | Sm | 1 (0.91) | 0.10 (0.09) | 0.13 (0.12) | 0.08 (0.07) | 1.77 (1.61) |
| Ref. Ex. 1 | None | 1 (1.00) | 0.00 (0.00) | 0.14 (0.14) | 0.10 (0.10) | 1.66 (1.66) |
| Comp. Ex. 1 | None | 1 (1.00) | 0.00 (0.00) | 0.52 (0.52) | 0.51 (0.51) | 0.02 (0.02) |

|  | Oxygen reduction onset potential [V vs. NHE] | Oxygen reduction current [mA/cm$^2$] at 0.7 V vs. NHE |
|---|---|---|
| Ex. 1 | 0.89 | 0.60 |
| Ex. 2 | 0.90 | 0.70 |
| Ex. 3 | 0.89 | 0.49 |

TABLE 1-continued

| Ex. 4 | 0.88 | 0.53 |
| Ex. 5 | 0.88 | 0.46 |
| Ex. 6 | 0.88 | 0.37 |
| Ex. 7 | 0.86 | 0.26 |
| Ex. 8 | 0.87 | 0.57 |
| Ex. 9 | 0.87 | 0.40 |
| Ex. 10 | 0.86 | 0.21 |
| Ex. 11 | 0.87 | 0.40 |
| Ex. 12 | 0.88 | 0.46 |
| Ex. 13 | 0.89 | 0.99 |
| Ex. 14 | 0.88 | 0.68 |
| Ex. 15 | 0.88 | 0.67 |
| Ex. 16 | 0.86 | 0.47 |
| Ref. Ex. 1 | 0.80 | 0.05 |
| Comp. Ex. 1 | 0.51 | 0.01 |

In Table 1, the numbers in parenthesis indicate ratios of the numbers of the atoms with respect to (a+b)=1.

INDUSTRIAL APPLICABILITY

The catalysts according to the invention are not corroded in acidic electrolytes or at high potential and have excellent durability and high oxygen reducing ability to find use in fuel cell catalyst layers, electrodes, electrode assemblies and fuel cells.

The invention claimed is:

1. A catalyst comprising a metal oxycarbonitride that contains titanium and at least one metal (hereinafter, also referred to as "metal M" or simply "M") selected from the group consisting of silver, calcium, strontium, yttrium, ruthenium, lanthanum, praseodymium, neodymium, promethium, samarium, europium, gadolinium, terbium, dysprosium, holmium, erbium, thulium, ytterbium and lutetium, wherein the metal oxycarbonitride is represented by the compositional formula $Ti_aM_bC_xN_yO_z$ (wherein a, b, x, y, and z represent a ratio of the numbers of the atoms, $0.7 \leq a \leq 0.9999$, $0.0001 \leq b \leq 0.3$, $0.01 \leq x \leq 2$, $0.01 \leq y \leq 2$, $0.01 \leq z \leq 3$, a+b=1, and $x+y+z \leq 5$).

2. The catalyst according to claim 1, which is a fuel cell catalyst.

3. A process for producing the catalyst described in claim 1, comprising a step (step 1a) of obtaining a metal carbonitride by heat treating a mixture that includes a metal M oxide, titanium oxide and carbon in nitrogen or a nitrogen compound-containing mixture gas; and a step (step 2a) of obtaining the metal oxycarbonitride by heat treating the metal carbonitride in an oxygen-containing mixture gas.

4. The process according to claim 3, wherein the heat treatment in the step 1a is performed at a temperature in the range of 800 to 2200° C.

5. The process according to claim 3, wherein the heat treatment in the step 2a is performed at a temperature in the range of 600 to 1400° C.

6. The process according to claim 3, wherein the oxygen-containing mixture gas in the step 2a further contains hydrogen at a concentration in the range of 0.01 to 5% by volume.

7. A fuel cell catalyst layer comprising the catalyst of claim 1.

8. The fuel cell catalyst layer according to claim 7, which further comprises electron conductive particles.

9. An electrode comprising a fuel cell catalyst layer and a porous support layer, wherein the fuel cell catalyst layer is the fuel cell catalyst layer of claim 7.

10. A membrane electrode assembly comprising a cathode, an anode and an electrolyte membrane interposed between the cathode and the anode, wherein the cathode and/or the anode is the electrode of claim 9.

11. A fuel cell comprising the membrane electrode assembly of claim 10.

12. A polymer electrolyte fuel cell comprising the membrane electrode assembly of claim 10.

* * * * *